United States Patent
Wilkinson et al.

(10) Patent No.: US 9,294,986 B2
(45) Date of Patent: Mar. 22, 2016

(54) TOPOLOGY DISCOVERY BASED ON EXPLICIT SIGNALING

(71) Applicant: Telefonaktiebolaget L M Ericsson (publ), Stockholm (SE)

(72) Inventors: Andrew Wilkinson, San Francisco, CA (US); Stefan Behrens, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 14 days.

(21) Appl. No.: 14/056,809

(22) Filed: Oct. 17, 2013

(65) Prior Publication Data

US 2015/0109994 A1    Apr. 23, 2015

(51) Int. Cl.
  *H04W 40/00* (2009.01)
  *H04W 40/24* (2009.01)
  *H04L 12/741* (2013.01)

(52) U.S. Cl.
  CPC ............. *H04W 40/246* (2013.01); *H04L 45/74* (2013.01)

(58) Field of Classification Search
  None
  See application file for complete search history.

(56) References Cited

U.S. PATENT DOCUMENTS

| | | | |
|---|---|---|---|
| 8,787,319 B2 | 7/2014 | Hapsari et al. | |
| 2006/0084470 A1* | 4/2006 | Hashimoto | H04W 76/022 455/552.1 |
| 2006/0215582 A1 | 9/2006 | Castagnoli | |
| 2007/0248103 A1 | 10/2007 | Delaney et al. | |
| 2009/0042597 A1* | 2/2009 | Yuuki | H04W 76/022 455/525 |
| 2009/0109933 A1 | 4/2009 | Murasawa et al. | |
| 2011/0075633 A1 | 3/2011 | Johansson et al. | |
| 2011/0086655 A1* | 4/2011 | Hwang | H04B 7/024 455/507 |
| 2011/0161394 A1* | 6/2011 | Chidel et al. | 709/203 |
| 2011/0243024 A1 | 10/2011 | Osterling | |
| 2011/0310791 A1* | 12/2011 | Prakash et al. | 370/315 |
| 2012/0314689 A1* | 12/2012 | Wang | 370/331 |

(Continued)

FOREIGN PATENT DOCUMENTS

| | | |
|---|---|---|
| EP | 2244495 | 10/2010 |
| WO | WO-2012/093893 | 7/2012 |

(Continued)

OTHER PUBLICATIONS

U.S. Appl. No. 14/056,760, Pending.

(Continued)

*Primary Examiner* — Kevin C Harper
*Assistant Examiner* — Derrick V Rose
(74) *Attorney, Agent, or Firm* — Nicholson De Vos; Webster & Elliott, LLP

(57) ABSTRACT

In one embodiment, a method for automatically creating a network route using a discovered IP address includes a first network device creating a connection-oriented interface with a first radio base station (RBS) for exchanging packets originating from the first RBS destined for the first network device, and for exchanging packets originating from the first network device destined for the first RBS, by receiving a first HELLO packet originating from the first RBS destined for the first network device, and transmitting a first HELLO packet destined for the first RBS. The method includes receiving, via the connection-oriented interface, a first CONNECT packet from the first RBS, the first CONNECT packet including a first IP address of the second RBS. The method includes creating a first network route between the first RBS and the second RBS using the first IP address included in the first CONNECT packet.

30 Claims, 26 Drawing Sheets

(56) References Cited

U.S. PATENT DOCUMENTS

| | | | |
|---|---|---|---|
| 2013/0051316 A1 | 2/2013 | Bhatt et al. | |
| 2013/0281097 A1 | 10/2013 | Jung | |
| 2014/0016628 A1* | 1/2014 | McCann | H04W 4/001 370/338 |
| 2015/0110062 A1 | 4/2015 | Nishio | |

FOREIGN PATENT DOCUMENTS

| | | |
|---|---|---|
| WO | WO-2012/148217 | 11/2012 |
| WO | WO-2013/137815 A2 | 9/2013 |

OTHER PUBLICATIONS

U.S. Appl. No. 14/056,770, Pending.
U.S. Appl. No. 14/056,814, Pending.
U.S. Appl. No. 14/056,825, Pending.
"3GPP TS 33.210 V5.0.0", 3rd Generation Partnership Project; Technical Specification Group Services and System Aspects; 3G Security; Network Domain Security; IP network layer security (Release 5); http://www.3gpp.org/ftp/tsg_sa/WG3_Security/_Specs/, (Mar. 2002), 19 pages.
"3GPP TS 36.300 V8.3.0", 3rd Generation Partnership Project; Technical Specification Group Radio Access Network; Evolved Universal Terrestrial Radio Access (E-UTRA) and Evolved Universal Terrestrial Radio Access Network (E-Utran); Overall description; Stage 2 (Release 8), (http://www.quintillion.co.jp/3GPP/Specs/36300-830.pdf), (Dec. 2007), 120 pages.
"3GPP TS 36.410 V8.0.0", 3rd Generation Partnership Project; Technical Specification Group Radio Access Network; Evolved Universal Terrestrial Access Network (E-UTRAN); S1 General aspects and principles (Release 8); http://www.quintillion.co.jp/3GPP/Specs/36410-800.pdf, (Dec. 2007), 13 pages.
"3GPP TS 36.412 V10.1.0", 3rd Generation Partnership Project; Technical Specification Group Radio Access Network; Evolved Universal Terrestrial Radio Access Network (E-UTRAN); S1 signalling transport (Release 10); http://www.quintillion.co.jp/3GPP/Specs/36412-a10.pdf, (Jun. 2011), 8 pages.
"3GPP TS 36.413 V9.3.0", 3rd Generation Partnership Project; Technical Specification Group Radio Access Network; Evolved Universal Terrestrial Radio Access Network (E-UTRAN); S1 Application Protocol (S1AP) (Release 9); http://www.quintillion.co.jp/3GPP/Specs/36413-930.pdf, (Jun. 2010), 241 pages.
"3GPP TS 36.420 V9.0.1", 3rd Generation Partnership Project; Technical Specification Group Radio Access Network; Evolved Universal Terrestrial Radio Access Network (E-UTRAN); X2 general aspects and principles (Release 9); http://www.quintillion.co.jp/3GPP/Specs/36420-901.pdf, (Mar. 2011), 12 pages.
"3GPP TS 36.422 V8.5.0", 3rd Generation Partnership Project; Technical Specification Group Radio Access Network; Evolved Universal Terrestrial Access Network (E-UTRAN); X2 signaling transport (Release 8); http://www.quintillion.co.jp/3GPP/Specs/36422-850.pdf, (Mar. 2009), 8 pages.
"3GPP TS 36.423 V9.2.0", 3rd Generation Partnership Project; Technical Specification Group Radio Access Network; Evolved Universal Terrestrial Radio Access Network (E-UTRAN); X2 application protocol (X2AP) (Release 9); http://www.quintillion.co.jp/3GPP/Specs/36423-920.pdf, (Mar. 2010), 120 pages.
"3GPP TS 36.424 V9.0.1", 3rd Generation Partnership Project; Technical Specification Group Radio Access Network; Evolved Universal Terrestrial Radio Access Network (E-UTRAN); X2 data transport (Release 9); http://www.quintillion.co.jp/3GPP/Specs/36424-901.pdf, (Mar. 2011), 8 pages.
Stewart, R.,"Stream Control Transmission Protocol", Network Working Group, Request for Comments (RFC): 4960; http://tools.ietf.org/html/rfc4960, (Sep. 2007), 152 pages.
"UMMT 3.0 Design Guide Technical Paper", *Cisco Systems, Inc., SDU-6432, Version 1.0,* https://communities.cisco.com/servlet/JiveServlet/downloadBody/30621-102-1-54762/UMMT_3.0_Design_Guide_Technical_Paper.pdf, (Jul. 12, 2012), 104 pages.

RFC 768: Postel, J., "User Datagram Protocol", RFC 768, (Aug. 28, 1980), 3 pages.
RFC 793: Postel, J., "Transmission Control Protocol", STD 7, RFC 793, *Internet Standard*, Information Sciences Institute, USC (Sep. 1981), 91 pages.
RFC 1058: Hedrick, C., "Routing Information Protocol", *Network Working Group, Request for Comments*: 1058, (Jun. 1988), 33 pages.
RFC 1142: Oran, David, "OSI ISIS Intradomain Routing Protocol", *Network Working Group, Request for Comments*: 1142, (Feb. 1990), 157 pages.
RFC 1180: Socolofsky, T., et al., "A TCP/IP Tutorial", *Network Working Group, Request for Comments*: 1180, (Jan. 1991), 28 pages.
RFC 2080: Malkin, et al., "RIPng for IPv6", *Network Working Group, Request for Comments*: 2080, (Jan. 1997), 19 pages.
RFC 2205: Braden, et al., "Resource ReSerVation Protocol (RSVP)—Version 1 Functional Specification", *Network Working Group, Request for Comments*: 2205, (Sep. 1997), 112 pages.
RFC 2210: Wroclawski, J., "The Use of RSVP with IETF Integrated Services", *Network Working Group, Request for Comments*: 2210, (Sep. 1997), 33 pages.
RFC 2211: Wroclawski, J., "Specification of the Controlled-Load Network Element Service", *Network Working Group, Request for Comments*: 2211, (Sep. 1997), 19 pages.
RFC 2212: Shenker, et al., "Specification of Guaranteed Quality of Service", *Network Working Group, Request for Comments*: 2212, (Sep. 1997), 20 pages.
RFC 2328: Moy, J., "OSPF Version 2", *Network Working Group, Request for Comments: 2328, The Internet Society*, (Apr. 1998), 244 pages.
RFC 2453: Malkin, G., "RIP Version 2", *Network Working Group, Request for Comments: 2453, The Internet Society*, (Nov. 1998), 39 pages.
RFC 2460: Deering, et al., "Internet Protocol, Version 6 (IPv6) Specification", *Network Working Group, Request for Comments: 2460, The Internet Society*, (Dec. 1998), 39 pages.
RFC 2474: Nichols, K., et al., "Definition of the Differentiated Services Field (DS Field) in the IPv4 and IPv6 Headers", *Network Working Group, Request for Comments: 2474, The Internet Society*, (Dec. 1998), 20 pages.
RFC 2475: Blake, S., et al., "An Architecture for Differentiated Services", *Network Working Group, Request for Comments 2475, The Internet Society*, (Dec. 1998), 36 pages.
RFC 2597: Heinanen, J., et al., "Assured Forwarding PHB Group", *The Internet Society*, RFC 2597, (Jun. 1999), 11 pages.
RFC 2675: Borman, D., et al., "IPv6 Jumbograms", *Network Working Group, Request for Comments: 2675, The Internet Society*, (Aug. 1999), 9 pages.
RFC 2983: Black, D., "Differentiated Services and Tunnels", *Network Working Group, Request for Comments: 2983, The Internet Society*, (Oct. 2000), 14 pages.
RFC 3086: Nichols, K., et al., "Definition of Differentiated Services Per Domain Behaviors and Rules for their Specification", *Network Working Group, Request for Comments: 3086, The Internet Society*, (Apr. 2001), 24 pages.
RFC 3140: Black, D., et al., "Per Hop Behavior Identification Codes", *Network Working Group, Request for Comments: 3140, The Internet Society*, (Jun. 2001), 8 pages.
RFC 3209: Awduche, D., et al., "RSVP-TE: Extensions to RSVP for LSP Tunnels", *Network Working Group, Request for Comments: 3209, The Internet Society*, http://tools.ietf.org/html/rfc3209, (Dec. 2001), 61 pages.
RFC 3246: Davie, B., et al., "An Expedited Forwarding PHB (Per-Hop Behavior)", *Network Working Group, Request for Comments: 3246, The Internet Society*, (Mar. 2002), 16 pages.
RFC 3247: Charny, A., et al., "Supplemental Information for the New Definition of EF PHB (Expedited Forwarding Per-Hop Behavior)", *Network Working Group, Request for Comments: 3247, The Internet Society*, (Mar. 2002), 24 pages.
RFC 3260: Grossman, D., "New Terminology and Clarifications for Diffserv", *Network Working Group, Request for Comments: 3260, The Internet Society*, (Apr. 2002), 10 pages.

(56) References Cited

OTHER PUBLICATIONS

RFC 3289: Baker, F., et al., "Management Information Base for the Differentiated Services Architecture", *Network Working Group, Request for Comments: 3289, The Internet Society*, (May 2002), 116 pages.
RFC 3290: Bernet, Y., et al., "An Informal Management Model for Diffserv Routers", *Network Working Group, Request for Comments: 3290, The Internet Society*, (May 2002), 56 pages.
RFC 3317: Chan, K., et al., "Differentiated Services Quality of Service Policy Information Base", *Network Working Group, Request for Comments: 3317, The Internet Society*, (Mar. 2003), 96 pages.
RFC 3473: Berger, L., "Generalized Multi-Protocol Label Switching (GMPLS) Signaling Resource ReserVation Protocol-Traffic Engineering (RSVP-TE) Extensions", *Network Working Group, Request for Comments*: 3473, http://tools.ietf.org/html/rfc3473, (Jan. 2003), 42 pages.
RFC 3936: Kompella, et al., "Procedures for Modifying the Resource reSerVation Protocol (RSVP)", *Network Working Group, Request for Comments: 3936, The Internet Society*, (Oct. 2004), 7 pages.
RFC 4113: Fenner, B., et al., "Management Information Base for the User Datagram Protocol (UDP)", *Network Working Group, Request for Comments: 4113, The Internet Society*, (Jun. 2005), 19 pages.
RFC 4271: Rekhter, Y., et al., "A Border Gateway Protocol 4 (BGP-4)", *Network Working Group, Request for Comments*: 4271, (Jan. 2006), 104 pages.
RFC 4301: Kent, et al., "Security Architecture for the Internet Protocol", *Network Working Group, Request for Comments: 4301, The Internet Society*, (Dec. 2005), 101 pages.
RFC 4309: Housley, "Using Advanced Encryption Standard (AES) CCM Mode with IPsec Encapsulating Security Payload (ESP)", *Network Working Group, Request for Comments: 4309, The Internet Society*, (Dec. 2005), 13 pages.
RFC 4495: Polk, et al., "A Resource Reservation Protocol (RSVP) Extension for the Reduction of Bandwidth of a Reservation Flow", *Network Working Group, Request for Comments: 4495, The Internet Society*, (May 2006), 21 pages.
RFC 4558: Ali, et al., "Node-ID Based Resource Reservation Protocol (RSVP) Hello: A Clarification Statement", *Network Working Group, Request for Comments: 4558, The Internet Society*, (Jun. 2006), 7 pages.
RFC 4594: Babiarz, J., et al., "Configuration Guidelines for DiffServ Service Classes", *Network Working Group, Request for Comments: 4594, The Internet Society*, (Aug. 2006), 57 pages.
RFC 5036: Andersson, L., et al., "LDP Specification", *Network Working Group, Request for Comments*: 5036, (Oct. 2007), 135 pages.
RFC 5340: Coltun, et al., "OSPF for IPv6", *Network Working Group Request for Comments: 5340, IETF*, https://tools.ietf.org/html/rfc5340, (Jul. 2008), 95 pages.

RFC 5405: Eggert, L., et al., "Unicast UDP Usage Guidelines for Application Designers", *Network Working Group, Request for Comments: 5405, IETF Trust*, (Nov. 2008), 27 pages.
RFC 5865: Baker, F., "A Differentiated Services Code Point (DSCP) for Capacity-Admitted Traffic", *Internet Engineering Task Force (IETF), Request for Comments: 5865, IETF Trust*, (May 2010), 14 pages.
Khan, et al., "The benefits of self-organizing backhaul networks", *Ericsson Review*, http://www1.ericsson.com/res/thecompany/docs/publications/ericsson_review/2013/er-son-transport.pdf, (Sep. 27, 2013), 9 pages.
Salmelin, et al., "Security in 3GPP Mobile Networks 303", *Chapter 9.1 of "Mobile Backhaul," John Wiley and Sons, Ltd.*, (May 2012), 3 pages.
U.S. Appl. No. 14/056,770, Non-Final Office Action, mailed May 13, 2015, 18 pages.
International Application No. PCT/IB2014/065183, PCT Notification of Transmittal of the International Search Report and the Written Opinion of the International Searching Authority, mailed Jan. 22, 2015, 14 pages.
U.S. Appl. No. 14/056,760, Non-Final Office Action, mailed May 6, 2015, 16 pages.
International Application No. PCT/IB2014/065184, PCT International Search Report and the Written Opinion of the International Searching Authority, mailed Jan. 22, 2015, 11 pages.
International Application No. PCT/IB2014/065185, PCT Notification of Transmittal of the International Search Report and the Written Opinion of the International Searching Authority, mailed Feb. 25, 2015, 11 pages.
"3GPP TS 36.422 V11.0.0", 3rd Generation Partnership Project; Technical Specification Group Radio Access Network; Evolved Universal Terrestrial Access Network (E-UTRAN); X2 signaling transport (Release 11); Oct. 2012, 8 pages.
"3GPP TS 36.423 V11.0.0", 3rd Generation Partnership Project; Technical NP LOB Specification Group Radio Access Network; Evolved Universal Terrestrial Radio Access Network (E-UTRAN); X2 application protocol (X2AP) (Release 11); Mar. 2012, 120 pages.
U.S. Appl. No. 14/056,825, Notice of Allowance, mailed Oct. 9, 2015, 16 pages.
U.S. Appl. No. 14/056,770, Final Office Action, mailed Oct. 29, 2015, 14 pages.
U.S. Appl. No. 14/056,760, Notice of Allowance, mailed Nov. 4, 2015, 8 pages.
U.S. Appl. No. 14/056,814, Non-Final Office Action, mailed Nov. 6, 2015, 37 pages.
International Application No. PCT/IB2014/065183, PCT Written Opinion of the International Preliminary Examining Authority, mailed Sep. 9, 2015, 11 pages.
International Application No. PCT/IB2014/065184, PCT Written Opinion of the International Preliminary Examining Authority, mailed Sep. 9, 2015, 9 pages.

* cited by examiner

SCTP INIT ACK Packet

```
X2AP {
  pdu value X2AP-PDU ::= initiatingMessage : {
    procedureCode 0
    criticality reject,                                    1405
    value HandoverRequest: {
      protocolIEs {                                        1415

########
        ## Additional IEs omitted ##
        ######## e-RABs-ToBeSetup-List {
          {
            id 4,
            criticality ignore,
            value E-RABs-ToBeSetup-Item : {
              e-RAB-ID 5,
              e-RAB-Level-QoS-Parameters {
                qCI 8,
                allocationAndRetentionPriority {
                  priorityLevel 12,
                  pre-emptionCapability shall-not-trigger-pre-emption,
                  pre-emptionVulnerability preemptable
                }
              },
              dL-Forwarding dL-forwardingProposed,
              uL-GTPtunnelEndpoint{
                transportLayerAddress'10100110 10001001 01100100 01001101'B
                gTP-TEID '82E379FA'H
              }
            }
          }
        }
        ########
        ## Additional IEs omitted ##
        ########
      }
    }
  }
}
```

```
X2AP {                                                          ← 1600
  pdu value X2AP-PDU ::= initiatingMessage : {
    procedureCode 0,
    criticality reject,                              ← 1605
    value HandoverRequestAcknowledge {
      protocolIEs {                                             ← 1615

########
        ## Additional IEs omitted ##
        ######## id 1,
        criticality ignore,
        value E-RABs-Admitted-List : {
          {
            id 0,
            criticality ignore,
            value E-RABs-Admitted-Item : {
              e-RAB-ID 5,
1610          dL-GTP-TunnelEndpoint {
                transportLayerAddress '01101011 01000101 11001100 00011010'B,
                gTP-TEID '2B458E9F'H                }
              }
            }
          }
          ########
          ## Additional IEs omitted ##
          ########
      }
    }
  }
}
```

FIG. 16

TOPOLOGY DISCOVERY BASED ON EXPLICIT SIGNALING

FIELD

Embodiments of the invention relate to the field of packet networks; and more specifically, to network topology discovery and automatic creation of network routes.

BACKGROUND

Currently, most of the X2-handover communication in a Long-Term Evolution (LTE) network is switched centrally at a Local/Regional Switching Site. However, $3^{rd}$ Generation Partnership Project (3GPP) is working on defining new applications that will be carried over the X2 interface, which is an interface used by eNodeBs (eNBs) for communicating with each other in an LTE network. These new applications include, for example, Coordinated Multipoint (COMP), Enhanced InterCell Interference Cancellation (eICIC), Location services, etc. These applications require much higher bandwidth and are also much less delay tolerant. Thus, there is a need for efficiently routing X2 traffic at the point closest to the eNBs.

Although a given eNB may only have 20-30 neighboring eNBs at a given time, the challenge is to dynamically create a path over a Hierarchical Multiprotocol Label Switching (H-MPLS) network only for eNBs that have X2 relation. The dynamic nature of cellular planning (i.e., adding/deleting/regrouping of cell sites) makes it very difficult and operationally almost impossible to statically configure all X2 members to a Multiprotocol Label Switching (MPLS) virtual private network (VPN).

SUMMARY

Exemplary methods for automatically performing X2 topology discovery and automatically create network routes using the discovered X2 IP address include a first network device that is communicatively coupled to a second network device in a network, wherein the first network device is communicatively coupled to a first radio base station (RBS), and the second network device is communicatively coupled to a second RBS. According to one embodiment, the exemplary methods, performed by the first network device, include creating a connection-oriented interface with the first RBS for exchanging one or more packets originating from the first RBS destined for the first network device, and for exchanging one or more packets originating from the first network device destined for the first RBS, by receiving a first HELLO packet originating from the first RBS destined for the first network device, and transmitting, in response to receiving the first HELLO packet, a first HELLO packet destined for the first RBS. In one embodiment, the exemplary methods include receiving, via the connection-oriented interface, a first CONNECT packet originating from the first RBS destined for the first network device, the first CONNECT packet including a first IP address of the second RBS. In one embodiment, the exemplary methods include creating, in response to receiving the first CONNECT packet, a first network route between the first RBS and the second RBS using the first IP address of the second RBS included in the first CONNECT packet.

In at least one embodiment, the methods further include receiving, via the connection-oriented interface, a second CONNECT packet originating from the first RBS destined for the first network device, the second CONNECT packet including the first IP address of the second RBS and a second IP address of the second RBS. In one aspect of the invention, the methods also include creating, in response to receiving the second CONNECT packet, a second network route between the first RBS and the second RBS using the second IP address of the second RBS included in the second CONNECT packet.

According to one embodiment, the exemplary methods include receiving, via the connection-oriented interface, a third CONNECT packet originating from the first RBS destined for the first network device, the third CONNECT packet including the first IP address of the second RBS, the second IP address of the second RBS, a third IP address of the second RBS, and a first IP address of the first RBS. In one embodiment, the methods also include creating, in response to receiving the third CONNECT packet, a third network route between the first RBS and the second RBS using the third IP address of the second RBS and the first IP address of the first RBS included in the third CONNECT packet.

In one embodiment, the exemplary methods include receiving, via the connection-oriented interface, a fourth CONNECT packet originating from the first RBS destined for the first network device, the fourth CONNECT packet including the second IP address of the second RBS, the third IP address of the second RBS, and the first IP address of the first RBS, wherein the first IP address of the second RBS is excluded from the fourth CONNECT packet. The methods further include removing, in response to receiving the fourth CONNECT packet and determining the first IP address of the second RBS is excluded from the fourth CONNECT packet, the first network route between the first RBS and the second RBS.

In one embodiment, the one or more packets originating from the first RBS destined for the first network device, and the one or more packets originating from the first network device destined for the first RBS are exchanged over the connection-oriented interface using an extensible messaging and presence protocol (XMPP). In one embodiment, the one or more packets originating from the first RBS destined for the first network device, and the one or more packets originating from the first network device destined for the first RBS are exchanged over the connection-oriented interface using message authentication.

In one embodiment, the exemplary methods further include receiving, via a first X2 interface, a first X2 packet from the first RBS, discovering a fourth IP address of the second RBS based on information of the first X2 packet, and creating, in response to discovering the fourth IP address of the second RBS, a fourth network route between the first RBS and the second RBS using the fourth IP address of the second RBS.

In another embodiment, the exemplary methods include receiving, via a second X2 interface a second X2 packet originating from the second RBS, discovering a fifth IP address of the second RBS based on information of the second X2 packet, and creating, in response to discovering the fifth IP address of the second RBS, a fifth network route between the first RBS and the second RBS using the fifth IP address of the second RBS. In one embodiment, the methods further include removing all network routes between the first RBS and the second RBS, in response to determining that a second HELLO packet originating from the first RBS has not been received by the first network device within a DEAD INTERVAL.

Exemplary methods for automatically performing X2 topology discovery and automatically create network routes using the discovered X2 IP address include a first radio base station (RBS) that is communicatively coupled to a first network device in a network, the first network device communicatively coupled to a second network device that is communicatively coupled to a second RBS. According to one embodiment, the exemplary methods, performed by the first RBS, include creating a connection-oriented interface with the first network device for exchanging one or more packets originating from the first RBS destined for the first network device, and for exchanging one or more packets originating from the first network device destined for the first RBS, by transmitting a first HELLO packet destined for the first network device, and receiving a first HELLO packet originating from the first network device. The exemplary methods include transmitting, in response to determining a first network route from the first RBS to the second RBS needs to be created, a first CONNECT packet destined for the first network device via the connection-oriented interface, the first CONNECT packet including a first IP address of the second RBS, wherein the first CONNECT packet causes the first network device to create the first network route using the first IP address of the second RBS.

In one embodiment, the exemplary methods include transmitting, in response to determining a second network route from the first RBS to the second RBS needs to be created, a second CONNECT packet destined for the first network device via the connection-oriented interface, the second CONNECT packet including the first IP address of the second RBS and a second IP address of the second RBS, wherein the second CONNECT packet causes the first network device to create the second network route using the second IP address of the second RBS.

In at least one embodiment, the exemplary methods include transmitting, in response to determining a third network route from the first RBS to the second RBS needs to be created, a third CONNECT packet destined for the first network device via the connection-oriented interface, the third CONNECT packet including the first IP address of the second RBS, the second IP address of the second RBS, a third IP address of the second RBS, and a first IP address of the first RBS, wherein the third CONNECT packet causes the first network device to create the third network route using the third IP address of the second RBS and the first IP address of the first RBS.

In one embodiment, the exemplary methods further include transmitting, in response to determining the first network route from the first RBS to the second RBS needs to be removed, a fourth CONNECT packet destined for the first network device via the connection-oriented interface, the fourth CONNECT packet including the second IP address of the second RBS, the third IP address of the second RBS, and the first IP address of the first RBS, wherein the fourth CONNECT packet excludes the first IP address of the second RBS, wherein by excluding the first IP address of the second RBS, the fourth CONNECT packet causes the first network device to remove the first network route.

In one embodiment, the one or more packets originating from the first RBS destined for the first network device, and the one or more packets originating from the first network device destined for the first RBS are exchanged over the connection-oriented interface using an extensible messaging and presence protocol (XMPP). In another aspect of the invention, the one or more packets originating from the first RBS destined for the first network devices, and the one or more packets originating from the first network device destined for the first RBS are exchanged over the connection-oriented interface using message authentication.

BRIEF DESCRIPTION OF THE DRAWINGS

Embodiments of the invention are illustrated by way of example and not limitation in the figures of the accompanying drawings in which like references indicate similar elements.

FIG. 14 is a diagram illustrating a pseudo code for SCTP X2-AP HANDOVER REQUEST packet according to one embodiment.

FIG. 16 is a diagram illustrating a pseudo code for SCTP X2-AP HANDOVER REQUEST ACK packet according to one embodiment.

DESCRIPTION OF EMBODIMENTS

Figure 1:
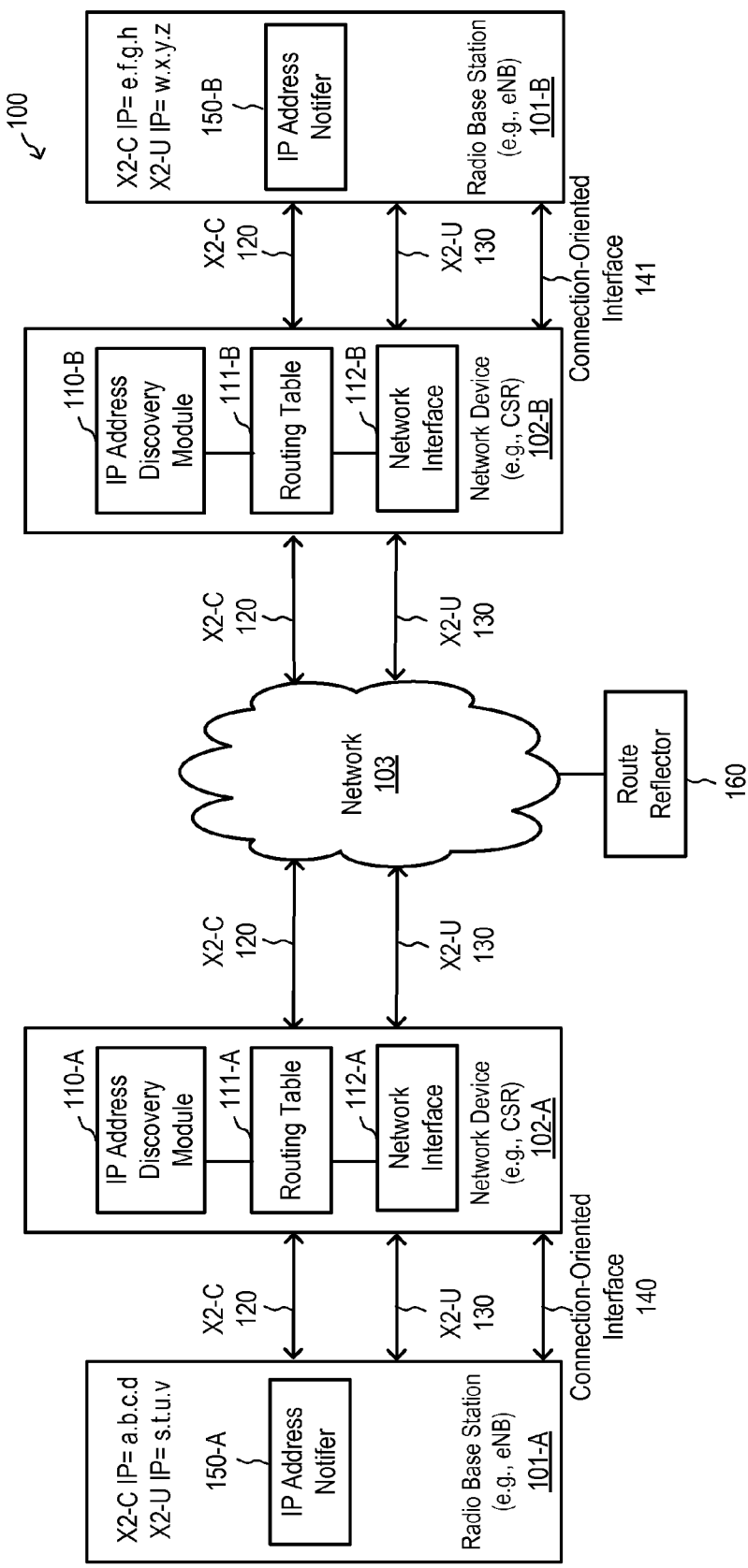
FIG. 1 is a block diagram illustrating a network according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (an network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Some network devices provide support for implementing VPNs (Virtual Private Networks) (e.g., Layer 2 VPNs and/or Layer 3 VPNs). For example, the network device where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE; and a context may be configured with a VPN protocol, and thus that context is referred as a VPN context.

When a radio access network (e.g., an LTE Radio Access Network (RAN)) connectivity is provided using MPLS-based Layer 3 VPNs (L3VPNs), various embodiments of the present invention provide mechanisms for automatically discovering, by cell site routers (CSRs), of IP addresses of remote eNBs for which the local eNBs have connectivity with (i.e., X2 relation). Embodiments of the present invention further provide mechanisms for using the discovered IP addresses to automatically create network routes, such as Virtual Private Network for IPv4 (VPNv4) and to automatically create the associated Virtual Routing Function (VRF) parameters in the CSRs to provide optimized connectivity for the X2 interfaces defined at the eNBs. By automatically creating network routes, the present invention removes the need to manually create specific filter lists at the CSRs, border routers, and route reflectors, which would otherwise be needed to control the scaling of state in a LTE transport service based on an H-MPLS network. In addition, the present invention provides mechanisms for automatically removing the automatically created routes when such routes are no longer required by the eNBs. Various embodiments of the present invention also include mechanisms for automatically setting up an IP security (IPsec) tunnel for securing the automatically created network routes between the CSRs. Throughout the description, the present invention is described by way of example in the context of CSRs and eNBs. It will be appreciated that the present invention is not so limited, and can be extended to apply to any network devices communicatively coupled to any radio base stations in any radio network.

The present invention provides multiple advantages, including:

Enabling operational simplicity and reducing configuration efforts at the CSRs.

Reducing memory requirements at the CSR.

Reducing CPU requirements at the CSR.

Reducing latency of X2-traffic.

Eliminating the need to hair-pin 100-500 Mbps traffic to local/regional switching site.

Enabling IPsec security for new VPNv4 short path routes between CSRs automatically.

Eliminating the dependency between Radio and Transport network planning.

According to some embodiments of the invention, a local CSR discovers the remote eNB X2 host IP addresses for which the local CSR's own locally connected eNBs have an X2 relation (i.e., connection). This shall herein be referred to as X2 topology discovery. Throughout the description, the terms "local" and "remote" are used to describe various network devices. As used herein, the terms "local" and "remote" are relative to a network device such as a CSR, and will be described in further details below. The X2 relation at a local eNB can be created in several ways, including by way of example and not limitation, by conventional Operations And Maintenance (OAM), Neighbor Relation (NR), and Transport Network Layer (TNL) Automatic Neighbor Relation (ANR). In response to discovering a remote X2 IP address, the local CSR can then setup a new "short" path/route to a remote CSR for the X2 traffic flow corresponding to the discovered X2 IP address. This process is also required at the remote CSR for X2 host addresses supported by the local CSR. Throughout the description, the terms "long" and "short" are used to describe network routes. As used herein, the term "long" is used to describe a network route that includes many network hops between a first network device that originates a packet and a second device for which the packet is intended. The term "short" is used to describe a network route that includes few network hops. These terms are explained in further details by way of example below.

In some embodiments, X2 topology discovery is performed by a local CSR "snooping" X2 traffic (e.g., X2-C traffic) exchanged between the local and remote eNBs. As used herein, "snooping" refers to the parsing/processing of packets for various purposes, such as determining a packet type of the packet. In such embodiments, the local CSR determines if an X2-C or X2-U more optimal path/route is required by analyzing/parsing the X2-C packets. All X2-C packets are exchanged between the eNBs using the Streaming Control Transmission Protocol (SCTP) protocol. The general format of an X2 SCTP IP packet is specified by 3GPP, and will be described in further details below.

In embodiments where X2 topology discovery is performed by snooping X2-C traffic, the local CSR identifies SCTP INIT ACK chunks are exchanged over the X2-C interface. Typically, SCTP INIT ACK packets are exchanged when the eNBs are creating a new (or re-initiating a downed) SCTP association over which all future X2-AP traffic will flow. In some embodiments, once the SCTP association has been established, the local CSR also identifies X2-AP messages exchanged between the eNBs over the X2-C interface for X2 IP discovery purposes. The local CSR discovers the IP addresses by accessing IP addresses contained in the various fields of the SCTP INIT ACK and X2-AP messages. The fields from which to access the IP addresses are determined based on various criteria, which are described in further details below.

In embodiments where X2-U topology discovery is performed by snooping X2-C traffic, the local CSR X2-AP HANDOVER REQUEST ACK messages received from a remote CSR (i.e., these HANDOVER messages originated from a remote eNB). In one embodiment, X2-AP HANDOVER ACK messages contain remote GPRS Tunneling Protocol User plane (GTP-U) Transport Network Layer (TNL) addresses that the remote eNB is instructing the local eNB to use for tunneling user packets over the X2-U interface during a handover process. In such an embodiment, the local CSR discovers the IP addresses of the remote eNBs by accessing the GTP-U TNL addresses. In other words, the GTP-U TNL addresses are used as the IP addresses of the remote eNBs. X2 topology discovery by snooping is discussed in further details below. Throughout the description, various X2 packets are described as being snooped for X2 topology discovery purposes. It will be appreciated that these X2 packets are described by way of example, and not limitation. Other packets can be snooped for X2 topology discovery purposes without departing from the broader scope and spirit of the present invention.

In one embodiment, X2 topology discovery is performed through an explicit communication between the eNBs and their local CSRs. In such an embodiment, the CSRs and the locally attached eNBs establish dedicated connection-oriented interfaces, over which remote X2 IP addresses are explicitly communicated by the eNBs to the local CSRs. X2 topology discovery by explicit communication is discussed in further details below.

FIG. 1 is a block diagram illustrating network 100 according to one embodiment. Network 100 can be any network, such as a 3G or LTE network. Network 100 includes network device 102-A (which in one embodiment is a CSR), communicatively coupled to network device 102-B (which in one embodiment is a CSR), over network 103 (which in one embodiment is an MPLS network). Throughout the description, network device 102-A is interchangeably referred to as CSR 101-A, $CSR_A$ or CSR[A], and network device 102-B is interchangeably referred to as CSR 102-B, $CSR_B$ or CSR[B]. In one embodiment, network devices 102-A and 102-B are communicatively coupled to route reflector 160 via network 103. In one embodiment, route reflector 160 is a network router that is configured to act as a focal point for Internal Border Gateway Protocol (IGBP) sessions. For example, multiple Border Gateway Protocol (BGP) routers can peer with route reflector 160 rather than peering with every other BGP router in the network. This provides large networks with IBGP scalability. Route reflectors are well known in the art, and for the sake of brevity, will not be discussed in full details here.

Network devices 102-A and 102-B are communicatively coupled to radio base stations (RBSs) 101-A and 101-B, respectively. In one embodiment, RBSs 101-A and 101-B are eNBs of an LTE network. RBSs 101-A and 101-B, and network devices 102-A and 102-B, are communicatively coupled via/over an X2 interface (such as the X2 interface defined by 3GPP). The X2 interface is used for optimal radio handovers, ICIC, and CoMP to carry both control and user plane flows. The X2 interface includes a control plane (known as an X2-C interface) for carrying the control data. The X2 interface also includes a user plane (known as an X2-U interface) for carrying user data. As illustrated in FIG. 1, RBSs 101-A and 101-B, and network devices 102-A and 102-B, are communicatively coupled over X2-C interface 120 and X2-U interface 130. Traffic exchanged over X2-C interface 120 shall herein be simply referred to as X2-C traffic, and traffic exchanged X2-U interface 130 shall herein be simply referred to as X2-U traffic. X2-C and X2-U traffic shall herein be collectively referred to as X2 traffic.

In one embodiment, X2-C interface 120 and X2-U interface 130 are used for carrying Internet Protocol (IP) flows between RBSs 101-A and 101-B. Thus, each RBS is typically associated with one or more IP addresses for communicating with each other over the X2 interface. As illustrated in FIG. 1, RBSs 101-A and 101-B are configured with an IP address of "a.b.c.d" and "e.f.g.h", respectively, for exchanging IP traffic over X2-C interface 120. RBSs 101-A and 101-B are also configured with an IP address of "s.t.u.v" and "w.x.y.z", respectively, for exchanging IP traffic over X2-U interface 130. IP addresses used for exchanging IP traffic over X2-C interface 120 shall herein be simply referred to as X2-C IP addresses. IP addresses used for exchanging IP traffic over X2-U interface 130 shall herein be simply referred to as X2-U IP addresses. X2-C IP addresses and X2-U IP addresses shall herein be collectively referred to as X2 IP addresses. Although each RBS is shown as having only one IP address for each of the X2 interface, it will be appreciated that more IP addresses can be configured.

Conventionally, RBSs exchange X2 traffic using network routes that are not optimized, i.e., the network routes/paths between the RBSs are "long". Throughout the description, the terms "long" and "short" are used to describe network routes. As used herein, a route is "long" if it includes many hops/nodes between a network device that originates the packet and the network device for which the packet is destined. On the other hand, a route is "short" if it includes few hops/nodes between the source and destination network devices. For example, a "long" route between RBS 101-A and RBS 101-B includes more hops between the two RBSs, as compared to a "short" route between the two RBSs. Embodiments of the present invention overcome the limitation of X2 traffic traversing a long route by discovering remote X2-C and/or X2-U IP addresses, and automatically creating network routes (e.g., VPN routes) using the discovered IP addresses, such that the routes are optimized (i.e., "short").

In one embodiment, network devices 102-A and 102-B include IP address discovery modules 110-A and 110-B for discovering IP addresses of remote RBSs. Throughout the description, the terms "remote" and "local" will be used to describe the RBSs and IP addresses. As used herein, the terms "local" and "remote" are relative to either network device 102-A or 102-B. For example, as illustrated in FIG. 1, network device 102-A has one local RBS (i.e., RBS 101-A) and one remote RBS (i.e., RBS 101-B). Likewise, network device 102-B has one local RBS (i.e., RBS 101-B) and one remote RBS (i.e., RBS 101-A). It will be appreciated, however, that there could be more RBSs communicatively coupled to network device 102-A and/or 101-B. In one embodiment, network devices 102-A and 102-B also include routing tables 111-A and 111-B, respectively, for storing routes that have been created automatically using the IP addresses discovered by IP address discovery modules 110-A and 110-B, respectively. IP address discovery modules 110-A and 110-B, and routing tables 111-A and 111B are described in further details below.

Conventionally, RBSs and CSRs do not have a dedicated interface that allows them to communicate directly with each other. The present invention overcomes this limitation by providing mechanisms that enable RBSs and CSRs to establish dedicated connection-oriented interfaces and exchange information. As illustrated in FIG. 1, RBS 101-A and network device 102-A are communicatively coupled via connection-oriented interface 140. Similarly, RBS 101-B and network device 102-B are communicatively coupled via connection-oriented interface 141. Thus, for example, a message originated by RBS 101-A destined for network device 102-A can be transmitted from RBS 101-A to network device 102-A over connection-oriented interface 140. Vice versa, a message originated by network device 102-A destined for RBS 101-A can be transmitted from network device 102-A to RBS 101-A over connection-oriented interface 140. As used herein, a message is "originated" from network device if the message was created/generated by that network device. As used herein, a message is "destined" for a network device if the message is intended for the receiving device.

In one embodiment, connection-oriented interfaces 140-141 are used by the RBSs to explicitly communicate remote X2 IP addresses to the respective network devices. For example, IP address notifier 150-A uses connection-oriented interface 140 to explicitly inform network device 102-A of the X2 IP addresses of remote RBSs (such as RBS 101-B). Likewise, IP address notifier 150-B uses connection-oriented interface 141 to explicitly inform network device 102-B of the X2 IP addresses of remote RBSs (such as RBS 101-A). Thus, connection-oriented interfaces 140-141 enable network devices 102-A and 102-B to discover remote X2 IP address through explicit communication with the respective local RBSs.

In one embodiment, packets/messages are exchanged over connection-oriented interfaces 140-141 using Extensible Messaging and Presence Protocol (XMPP). In one embodiment, the messages exchanged over connection-oriented interfaces 140-141 are authenticated using a message authentication such as Open Shortest Path First (OSPF). Message authentication prevents, or at least reduces the probability, of an impersonation of an RBS by an attacker who has gained access to the network. Without message authentication, such an attacker could impair network performance by running a denial of service or other similar types of attacks by sending forged messages to network devices 102-A and/or 102-B.

In one embodiment, network devices 102-A and 102-B include network interfaces 112-A and 112-B, respectively, for exchanging network traffic (e.g., packets over X2-C interface 120, X2-U interface 130, connection-oriented interfaces 140-141).

X2 Topology Discovery Option 1: X2 IP Address Discovery Using Snooping

Figure 2:
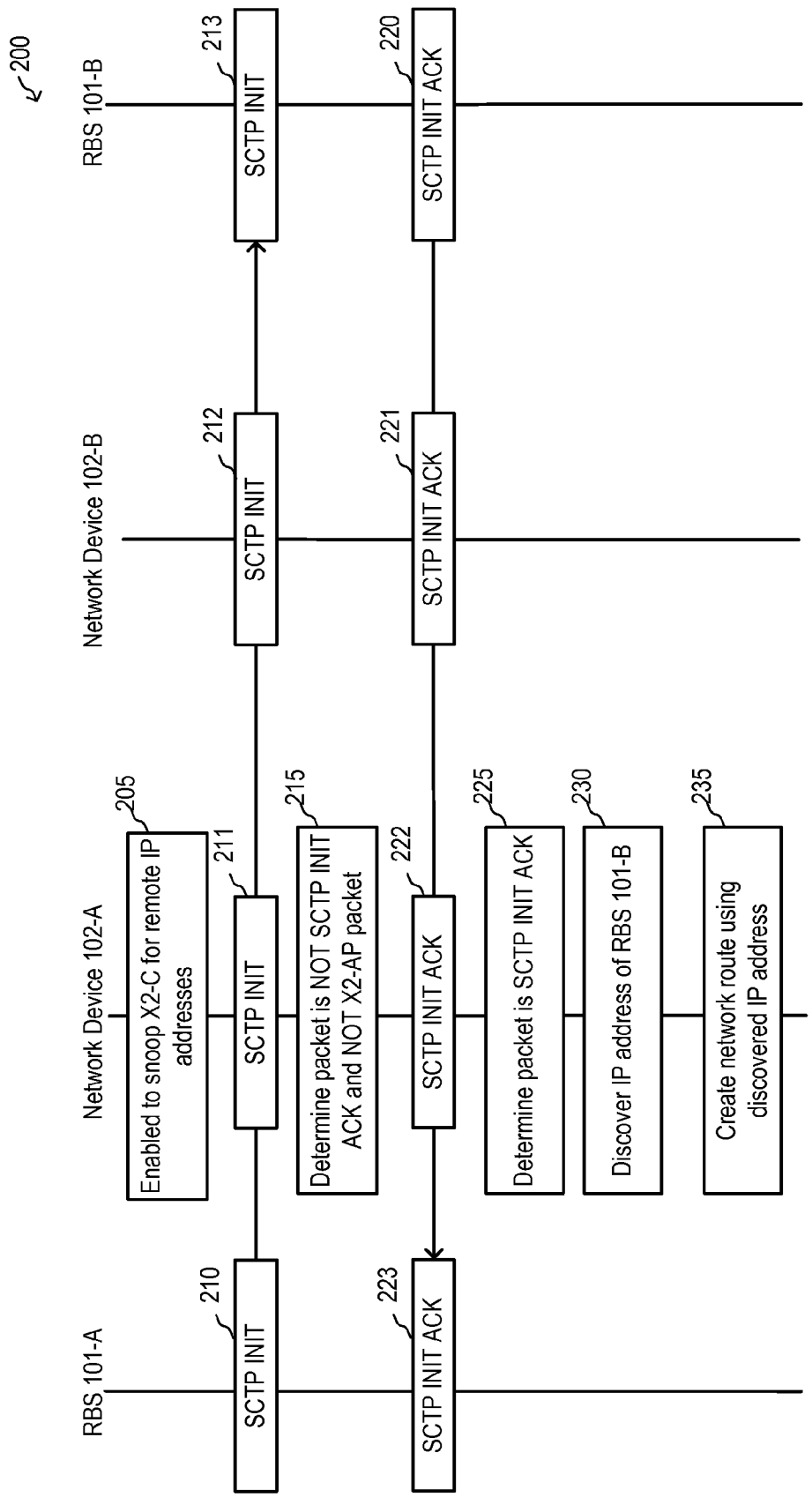
FIG. 2 is a transaction diagram illustrating a process flow for performing X2 topology discovery according to one embodiment.

FIG. 2 is a transaction diagram illustrating process flow 200 for performing X2 topology discovery according to one embodiment. Process flow 200 will be described with reference to FIG. 1. At transaction 205, network device 102-A is enabled to snoop X2-C interface 120 for remote X2-C IP addresses. At transaction 210, RBS 101-A initiates a stream control transmission protocol (SCTP) association by transmitting an SCTP INIT packet destined for RBS 101-B. At transactions 211-212, network devices 102-A and 102-B, respectively, forward the SCTP INIT packet to RBS 101-B, which receives the packet at transaction 213. In one embodiment, each network device (e.g., network device 102-A and/or 102-B) is configured to snoop X2-C packets to determine if a remote X2-C IP address can be discovered from the X2-C packet, for example, by determining if an X2-C packet is an SCTP INIT ACK or X2-AP packet. In one embodiment, network device 102-A is configured to snoop all X2-C packets. In an alternate embodiment, network device 102-A is configured to snoop some, but not all X2 packets. For example, network device 102-A can be configured to snoop N out of M X2-C packets, where N and M are configurable by a system administrator. Alternatively, network device 102-A can be configured to snoop N packets for each predetermined period of time.

At transaction 215, network device 102-A snoops the SCTP INIT packet and determines that the packet is not an SCTP INIT ACK and not an X2-AP packet. Thus, network device 102-A does not discover any remote X2-C IP address from the SCTP INIT packet. At transaction 220, in response to receiving the SCTP INIT, RBS 101-B initiates an SCTP INIT ACK packet destined for RBS 101-A. At transactions 221-222, network device 102-B and network device 102-A, respectively, forward the SCTP INIT ACK packet to RBS 101-A, which receives the packet at transaction 223.

At transaction 225, network device 102-A snoops the packet received at transaction 222 and determines the packet is an SCTP INIT ACK. At transaction 230, in response to determining the packet is an SCTP INIT ACK, network device 102-A discovers a remote X2-C IP address based on information of the SCTP INIT ACK. At transaction 235, network device 102-A uses the discovered IP address to create a network route (e.g., a VPN route) between RBS 101-A and RBS 101-B.

Figure 3:
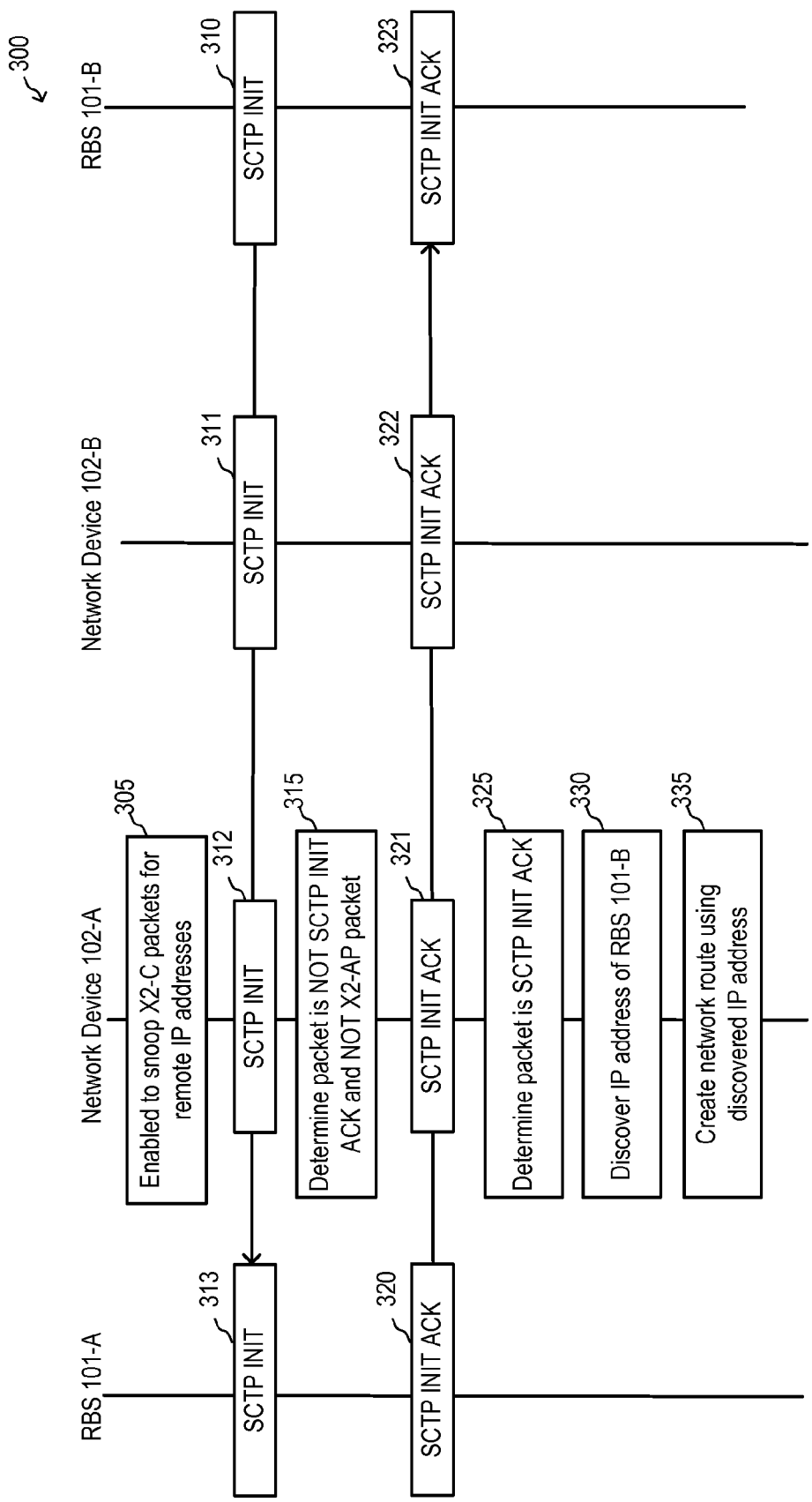
FIG. 3 is a transaction diagram illustrating a process flow for performing X2 topology discovery according to one embodiment.

FIG. 3 is a transaction diagram illustrating process flow 300 for performing X2 topology discovery according to one embodiment. Process flow 300 will now be described with reference to FIG. 1. At transaction 305, network device 102-A is enabled to snoop X2-C packets for remote X2-C IP addresses.

At transaction 310, RBS 101-B initiates an SCTP association by transmitting an SCTP INIT packet destined for RBS 101-A. At transactions 311-312, network devices 102-B and 102-A, respectively, forward the SCTP INIT packet to RBS 101-A, which receives the packet at transaction 313. In one embodiment, network device 102-A and/or network 102-B is configured to snoop X2-C packets to determine if a remote X2-C IP address can be discovered from the X2-C packet, such as SCTP INIT ACK and X2-AP packets.

At transaction 315, network device 102-A snoops the SCTP INIT packet and determines that the packet is not an SCTP INIT ACK and not an X2-AP packet. Thus, network device 102-A does not discover any remote X2-C IP address from the SCTP INIT packet. At transaction 320, in response to receiving the SCTP INIT, RBS 101-A initiates an SCTP INIT ACK packet destined for RBS 101-B. At transactions 321-322, network device 102-A and network device 102-B, respectively, forward the SCTP INIT ACK packet to RBS 101-B, which receives the packet at transaction 323.

At transaction 325, network device 102-A snoops the packet received at transaction 321 and determines the packet is an SCTP INIT ACK. At transaction 330, network device 102-A discovers a remote X2-C IP address based on information of the SCTP INIT ACK. At transaction 335, network device 102-A uses the discovered IP address to create a network route (e.g., a VPN route) between RBS 101-A and RBS 101-B.

Figure 4:
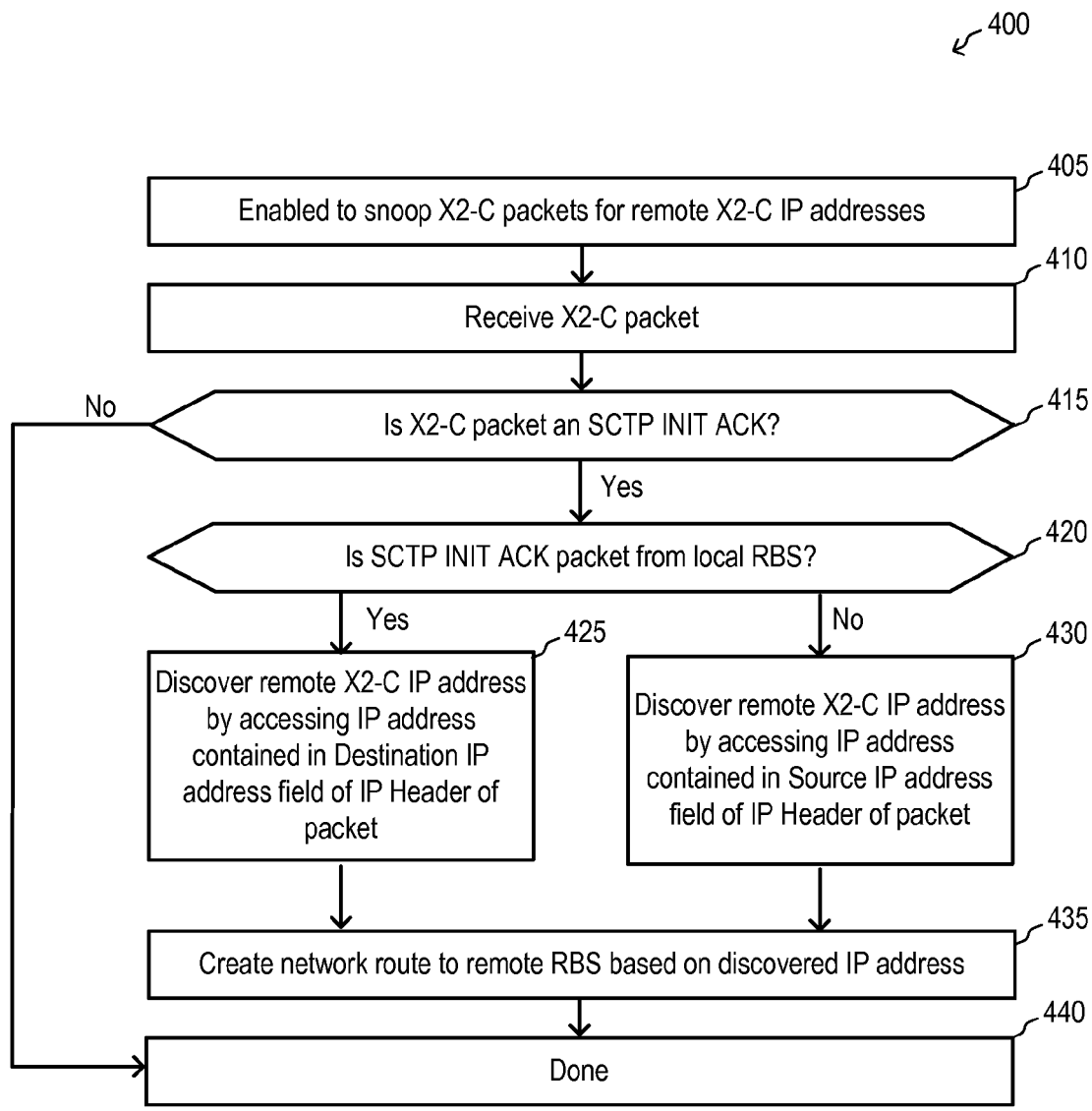
FIG. 4 is a flow diagram illustrating a method for performing X2 topology discovery according to one embodiment.

FIG. 4 is a flow diagram illustrating method 400 for performing X2 topology discovery according to one embodiment. For example, method 400 can be performed by network device 102-A (such as IP address discovery module 110-A of network device 102-A), or network device 102-B (such as IP address discovery module 110-B of network device 102-B), either of which can be implemented as software, firmware, hardware, or any combination thereof. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

Method 400 will now be discussed with reference to previously discussed figures. At block 405, a network device (such as network device 102-A) is enabled to snoop X2-C packets for remote X2-C IP addresses. At block 410, the network device receives an X2-C packet. At block 415, the network device determines whether the X2-C packet is an SCTP INIT ACK.

An SCTP packet can carry various types packets, for example, SCTP INIT, SCTP INIT ACK, X2-AP packets/messages (which in turn, can carry different types of packets/messages, such as HANDOVER REQUEST and HANDOVER REQUEST ACK). For the sake of brevity, these types of packets shall be referred to directly without any reference to the SCTP packet itself. For example, an SCTP packet carrying an SCTP INIT ACK shall simply be referred to as an SCTP INIT ACK Similarly, an SCTP packet carrying one or more X2-AP packets shall simply be referred to as an X2-AP packet. Further, an X2-AP packet carrying a HANDOVER REQUEST ACK shall simply be referred to as a HANDOVER REQUEST ACK, respectively. Throughout the description, references are made to various fields of these packets. The description describes, by way of example, and not limitation, these packets as having certain formats as defined by 3GPP. It will be appreciated that the present invention can be applicable to packets having other predetermined formats.

Figure 5:
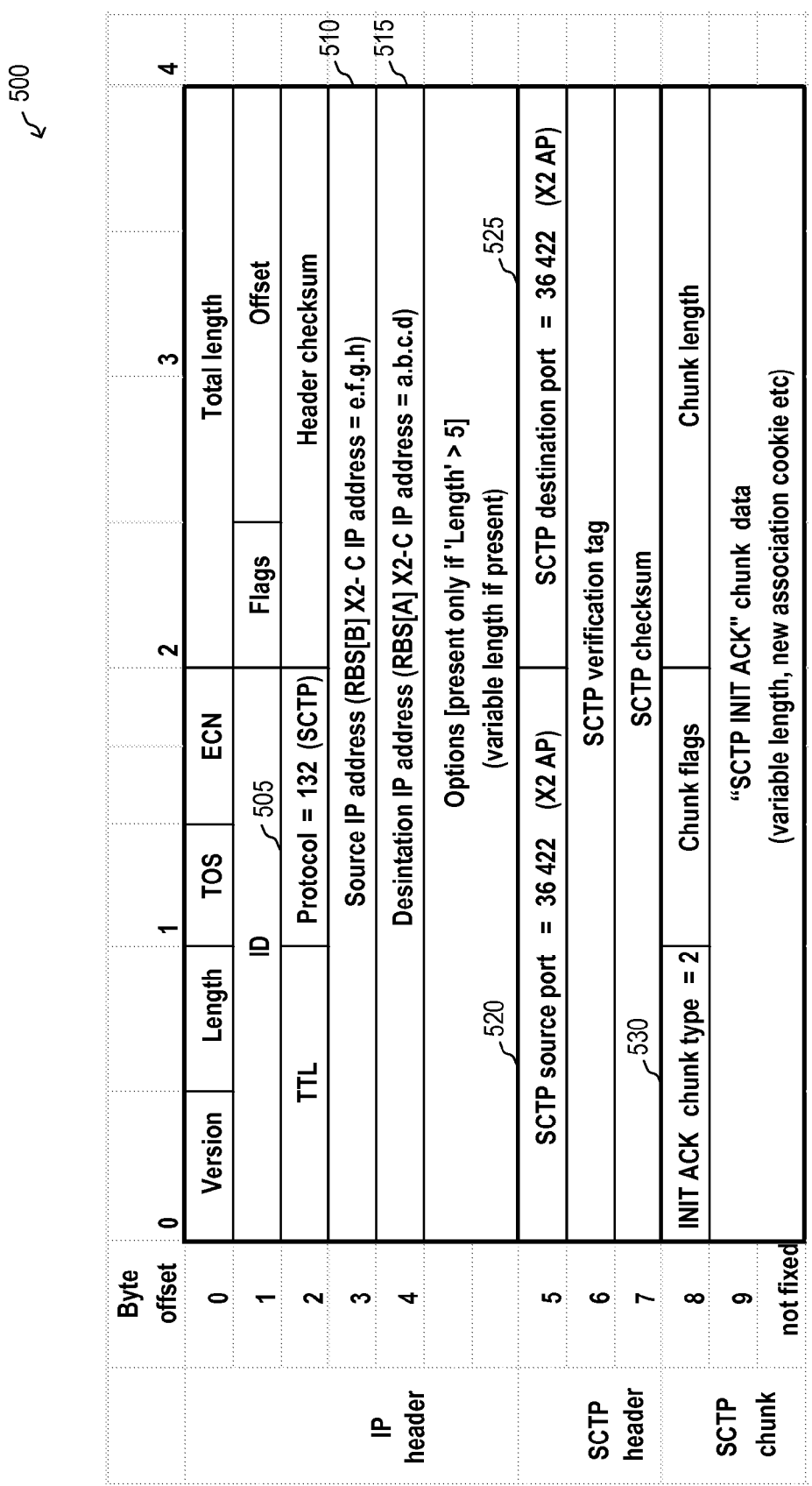
FIG. 5 is a block diagram illustrating a SCTP INIT ACK packet according to one embodiment.

FIG. 5 is a block diagram illustrating SCTP packet 500 carrying an SCTP INIT ACK packet as defined by 3GPP. Each SCTP packet includes an IP header, an SCTP header, and one or more SCTP chunks, each chunk being identified by a chunk type/ID. In the case of an SCTP INIT or SCTP INIT ACK packet, there is only one SCTP chunk per SCTP packet.

An SCTP INIT ACK packet is defined by an SCTP packet with a protocol field (e.g., protocol field 505) having the value 132, an SCTP source port field (such as SCTP source port field 520) and a SCTP destination port field (such as SCTP destination port field 525) both having the value 36,422, and a chunk type/ID (such as chunk type field 530) having the value 2. Each SCTP packet includes a source IP address field (such as source IP address field 510) and a destination IP address field (such as destination IP address field 515) as part of its IP header. Depending on whether the SCTP INIT ACK originated from a local or remote RBS, either the IP address contained in the source IP address field (e.g., source IP address field 510) or the destination IP address contained in the destination IP address field (e.g., destination IP address field 515) is accessed by the network device and used as a discovered remote X2-C IP address. FIG. 5 illustrates by way of example, and not limitation, a format of an SCTP INIT ACK packet. It will be appreciated that other formats can be used without departing from the broader scope and spirit of the present invention.

Referring now back to FIG. 4, if the X2-C packet is not an SCTP INIT ACK packet, method 400 is completed at block 440. At block 420, if the X2-C packet is an SCTP INIT ACK packet, the network device determines if the SCTP INIT ACK originated from a local RBS (such as RBS 101-A). At transaction 425, in response to determining the SCTP INIT ACK is from a local RBS, the network device discovers a remote X2-C IP address by accessing an IP address contained in a destination IP address field, such as destination IP address field 515. At transaction 430, in response to determining the SCTP INIT ACK did not originate from a local RBS (e.g., the SCTP INIT ACK originated from remote RBS 101-B), the network device discovers a remote X2-C IP address by accessing an IP address contained in a source IP address field, such as source IP address field 510.

At transaction 435, in response to discovering a remote X2-C IP address, the network device uses the discovered IP address to create a network route (e.g., a VPN route) from the local RBS to the remote RBS associated with the discovered IP address. In one embodiment, the network device only creates the network route if one does not already exist in a routing table (e.g., routing table 111-A). In one embodiment, in response to creating the network route, the network route stores the route information in the routing table in order to prevent redundant creation of routes for every discovered remote X2 IP address.

Figure 6:
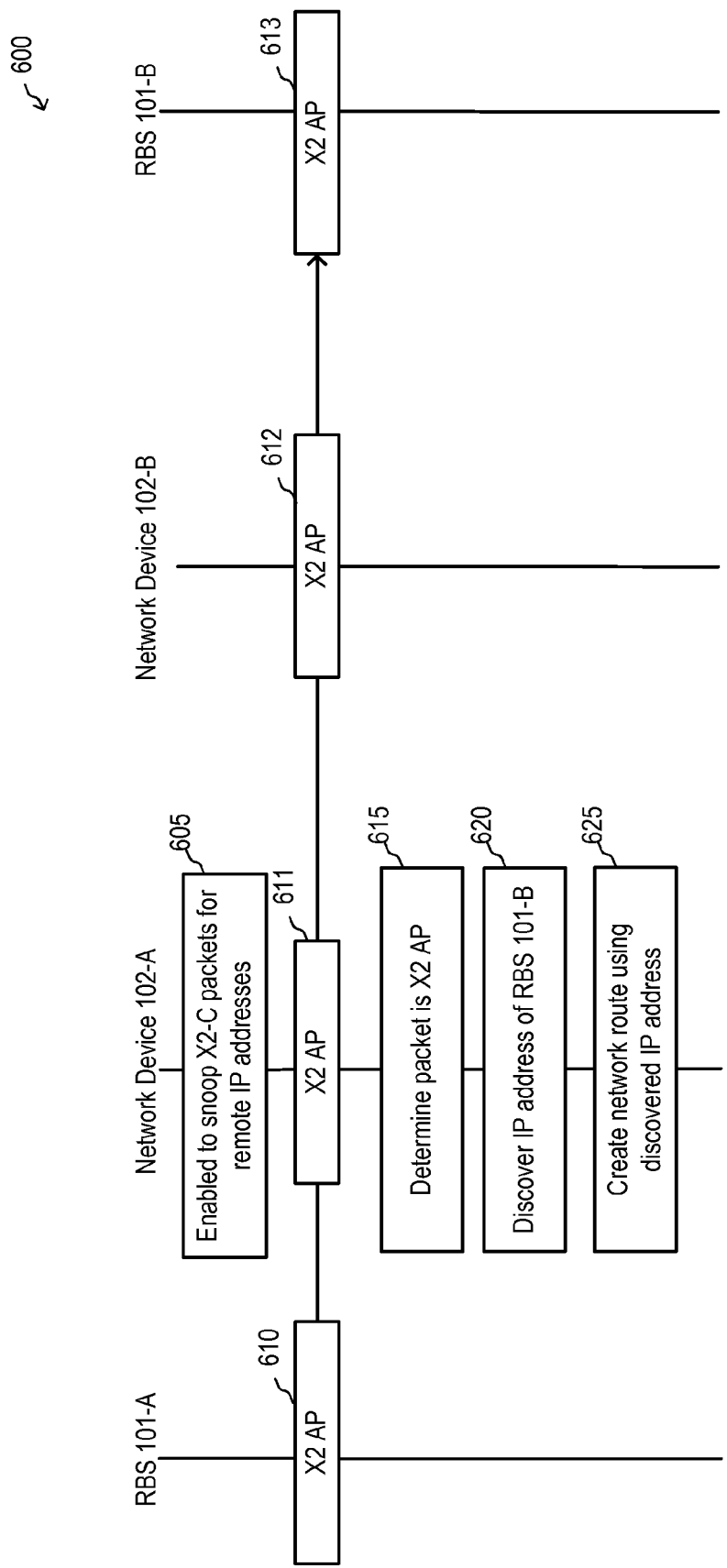
FIG. 6 is a transaction diagram illustrating a process flow for performing X2 topology discovery according to one embodiment.

FIG. 6 is a transaction diagram illustrating process flow 600 for performing X2 topology discovery according to one embodiment. Process flow 600 assumes an SCTP association has been previously established by RBSs 101-A and 101-B. Process flow 600 will now be described with reference to FIG. 1. At transaction 605, network device 102-A is enabled to snoop X2-C packets for remote X2-C IP addresses.

At transaction 610, RBS 101-A initiates an SCTP X2-AP packet destined for RBS 101-B by transmitting the packet to network device 102-A. At transactions 611-612, network devices 102-A and 102-B, respectively, forward the X2-AP packet to RBS 101-B, which receives the packet at transaction 613. In one embodiment, network device 102-A and/or network device 102-B is configured to snoop X2-C packets to determine if a remote X2-C IP address can be discovered from the X2-C packets, e.g., by determining if the X2-C packet is an SCTP INIT ACK or X2-AP packet.

At transaction 615, network device 102-A snoops the packet received at transaction 611 and determines the packet is an X2-AP packet. At transaction 620, in response to determining the packet is an X2-AP packet, network device 102-A discovers a remote X2-C IP address based on information of the X2-AP packet. At transaction 625, network device 102-A uses the discovered IP address to create a network route (e.g., a VPN route) between RBS 101-A and RBS 101-B.

Figure 7:
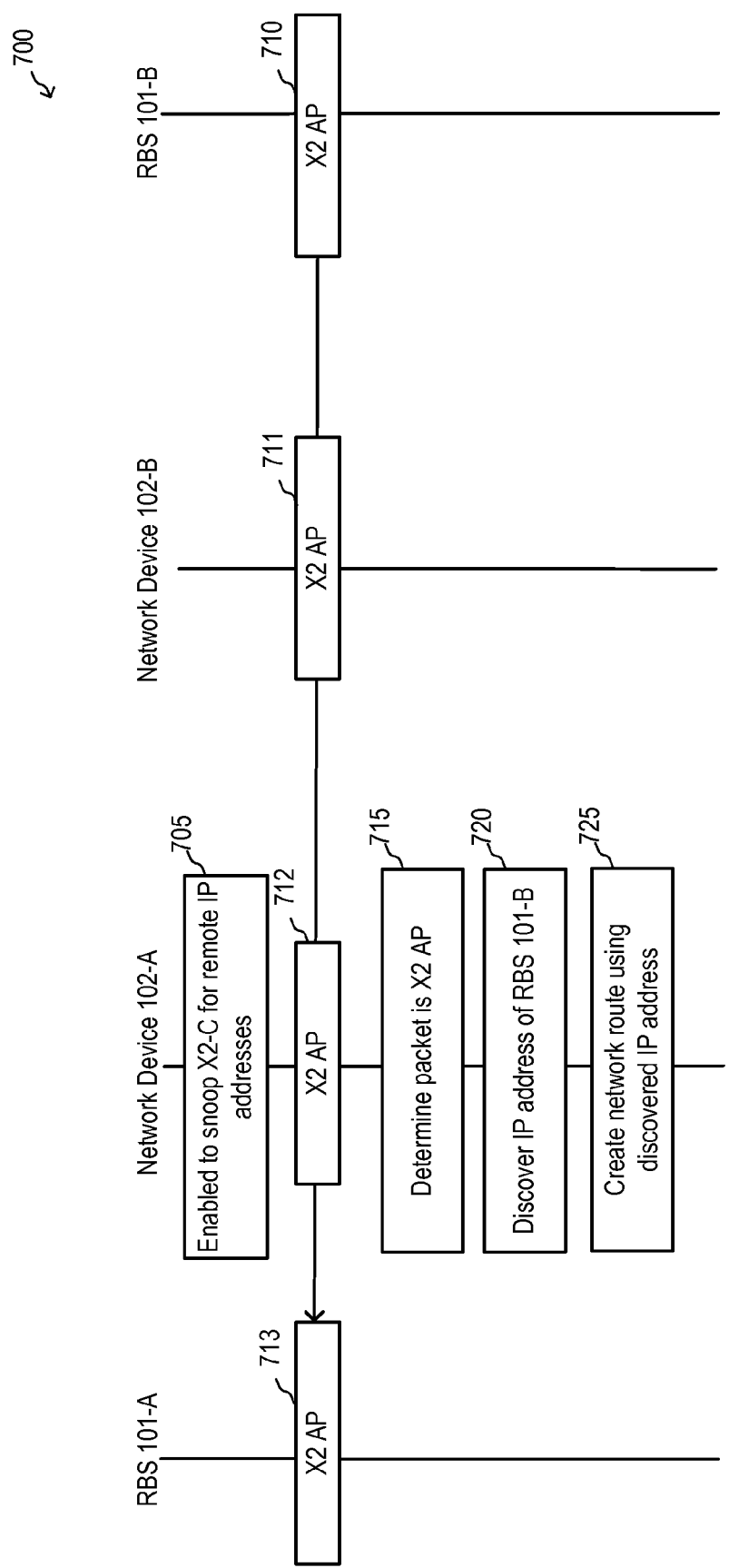
FIG. 7 is a transaction diagram illustrating a process flow for performing X2 topology discovery according to one embodiment.

FIG. 7 is a transaction diagram illustrating process flow 700 for performing X2 topology discovery according to one embodiment. Process flow 700 assumes an SCTP association has been previously established by RBSs 101-A and 101-B. Process flow 700 will now be described with reference to FIG. 1. At transaction 705, network device 102-A is enabled to snoop X2-C packets for remote X2-C IP addresses.

At transaction 710, RBS 101-B initiates an SCTP X2-AP packet destined for RBS 101-A by transmitting the packet to network device 102-B. At transactions 711-712, network devices 102-B and 102-A, respectively, forward the X2-AP packet to RBS 101-A, which receives the packet at transaction 713. In one embodiment, network device 102-A and/or 102-B is configured to snoop X2-C packets to determine if a remote X2-C IP address can be discovered from the X2-C packet, e.g., by determining if the X2-C packet is an SCTP INIT ACK or X2-AP packet.

At transaction 715, network device 102-A snoops the packet received at transaction 712 and determines the packet is an X2-AP packet. At transaction 720, in response to determining the packet is an X2-AP packet, network device 102-A discovers a remote X2-C IP address based on information of the X2-AP packet. At transaction 725, network device 102-A uses the discovered IP address to create a network route (e.g., a VPN route) between RBS 101-A and RBS 101-B.

Figure 8:
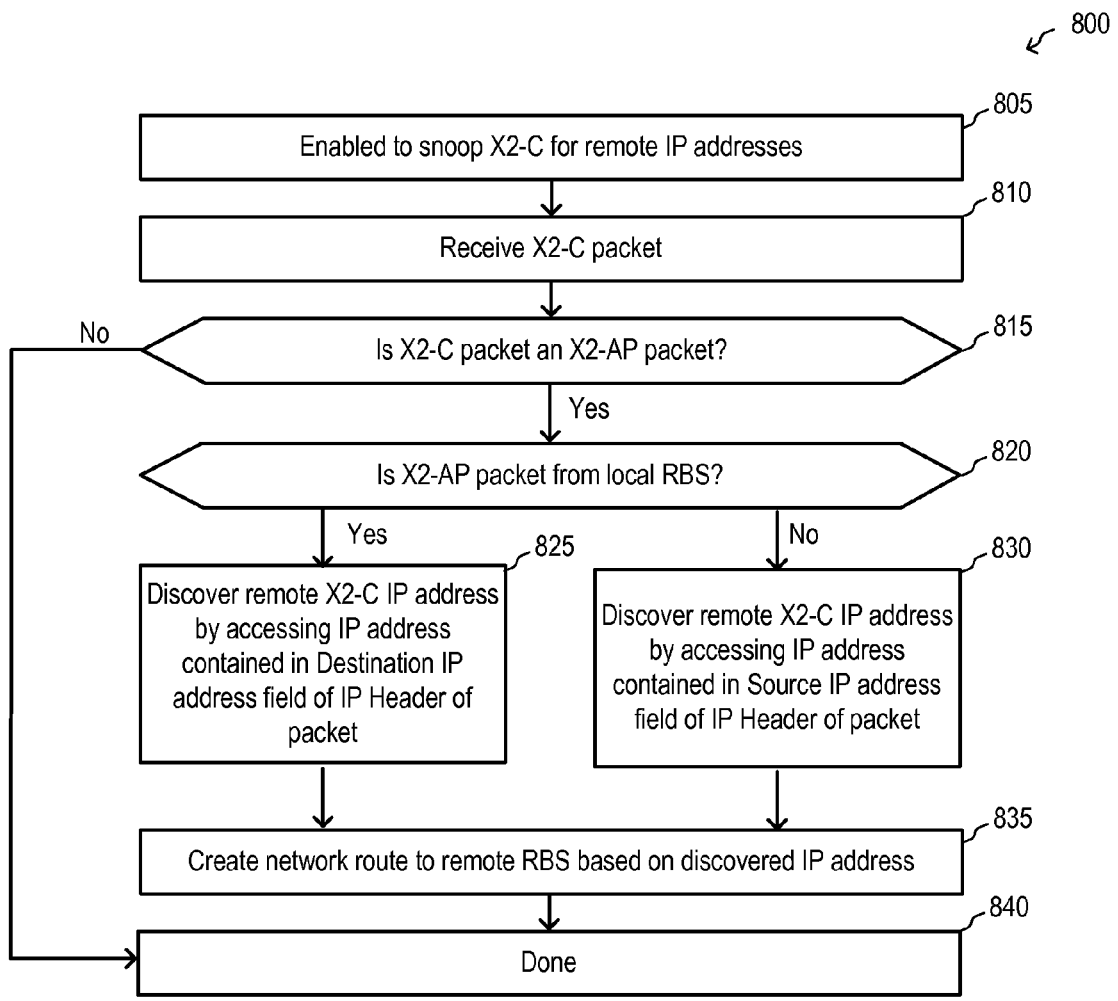
FIG. 8 is a flow diagram illustrating a method for performing X2 topology discovery according to one embodiment.

FIG. 8 is a flow diagram illustrating method 800 for performing X2 topology discovery according to one embodiment. For example, method 800 can be performed by network device 102-A (such as IP address discovery module 110-A of network device 102-A), or network device 102-B (such as IP address discovery module 110-B of network device 102-B), either of which can be implemented as software, firmware, hardware, or any combination thereof.

Figure 9:
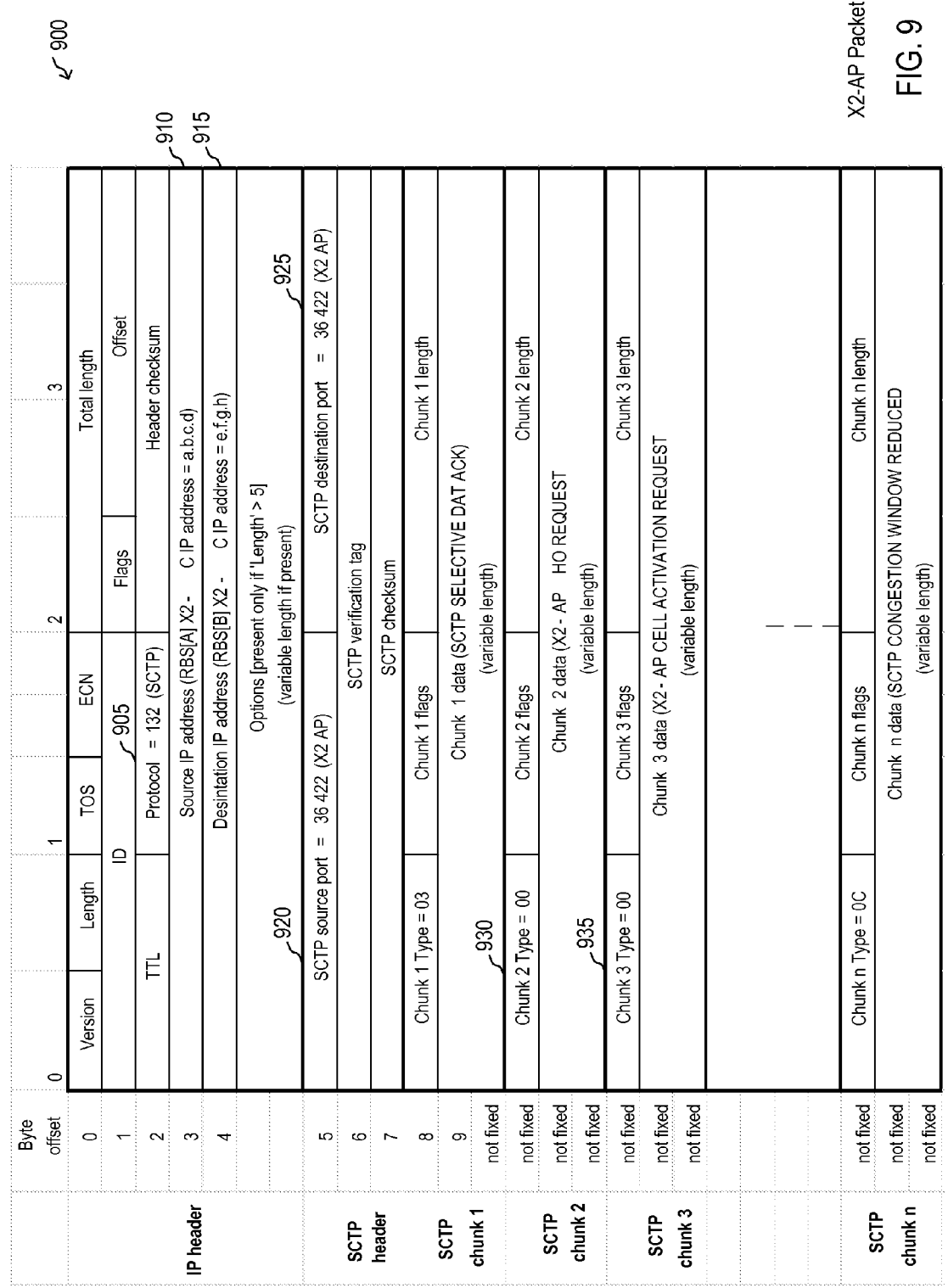
FIG. 9 is a block diagram illustrating a SCTP X2-AP packet according to one embodiment.

Method 800 will now be discussed with reference to previously discussed figures. At block 805, a network device (e.g., network device 102-A) is enabled to snoop X2-C packets for remote X2-C IP addresses. At block 810, the network device receives an X2-C packet. At block 815, the network device determines whether the X2-C packet is an X2-AP packet. FIG. 9 is a block diagram illustrating SCTP packet 900 carrying two X2-AP packets (one in SCTP chunk 2 and another in SCTP chunk 3) as defined by 3GPP. An X2-AP packet is defined by an SCTP packet with a protocol field (e.g., protocol field 905) having the value 132, an SCTP source port field (such as SCTP source port field 920) and a SCTP destination port field (such as SCTP destination port field 925) both having the value 36,422, and a chunk type/ID (such as chunk type field 930 or chunk type field 935) having the value 0. Each SCTP packet includes a source IP address field (such as source IP address field 910) and a destination IP address field (such as destination IP address field 915). Depending on whether the X2-AP originated from a local or remote RBS, either the source IP address field or the destination IP address field is accessed by the network device and used as a discovered remote X2-C IP address. FIG. 9 illustrates a format of an X2 AP packet by way of example, and not limitation. It will be appreciated that other X2 AP packet formats can be used without departing from the broader scope and spirit of the present invention.

Referring now back to FIG. 8, if the X2-C packet is not an X2-AP packet, method 800 is completed at block 840. At block 820, if the X2-C packet is an X2-AP packet, the network device determines if the X2-AP originated from a local RBS (such as RBS 101-A). At transaction 825, in response to determining the X2-AP is from a local RBS, the network device discovers a remote X2-C IP address by accessing an IP address contained in a destination IP address field (such as destination IP address field 915). At transaction 830, in response to determining the X2-AP is not from a local RBS (e.g., the X2-AP packet originated from remote RBS 101-B), the network device discovers a remote X2-C IP address by accessing an IP address contained in a source IP address field (such as source IP address field 910).

At transaction 835, in response to discovering a remote X2-C IP address, the network device uses the discovered IP address and creates a network route (e.g., a VPN route) from the local RBS to the remote RBS. In one embodiment, the network device only creates the network route if one does not already exist in a routing table (such as routing table 111-A). In one embodiment, in response to creating the network route, the network device stores the route information in the routing table in order to prevent redundant creation of routes for every discovered remote X2 IP address.

Figure 10:
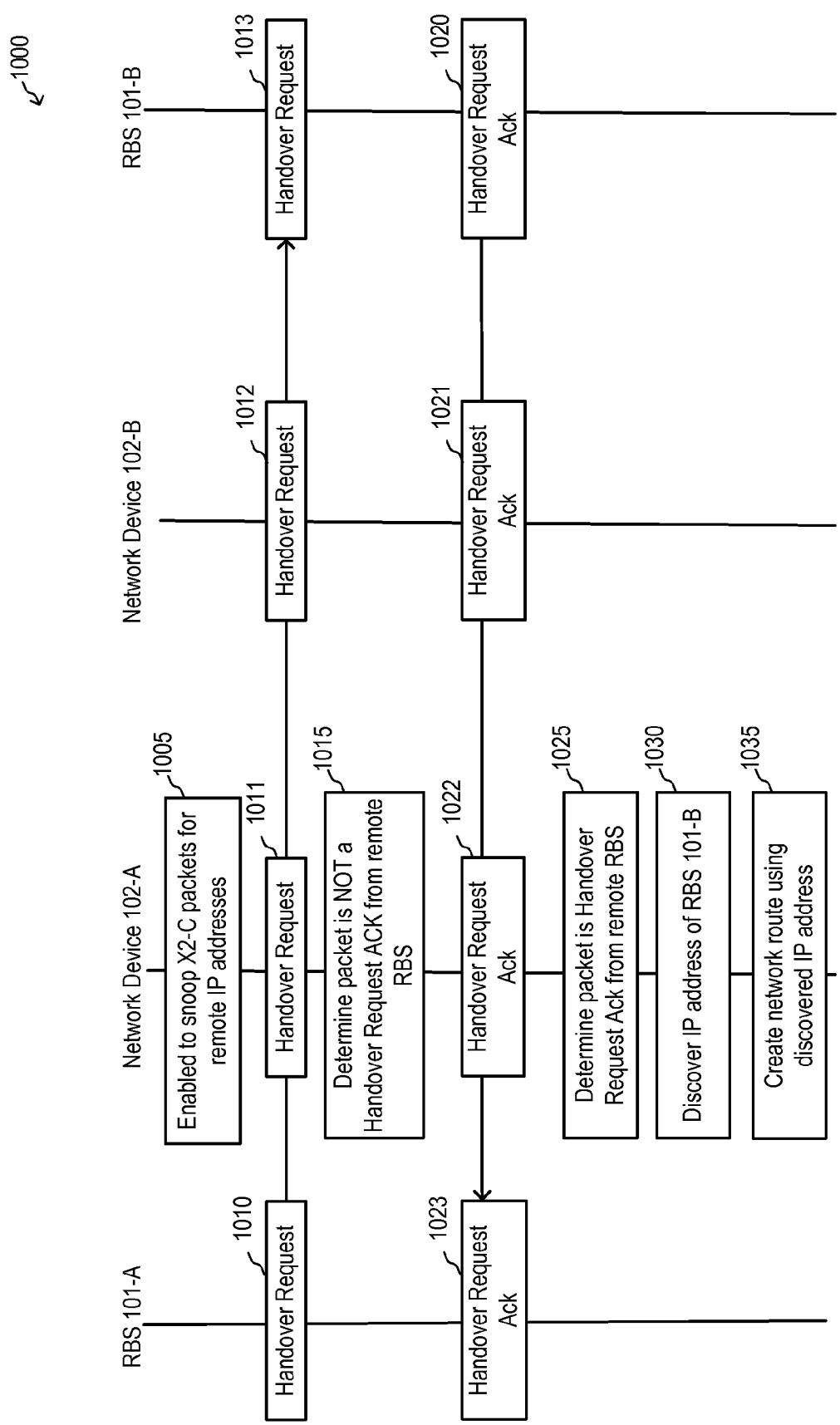
FIG. 10 is a transaction diagram illustrating a process flow for performing X2 topology discovery according to one embodiment.

FIG. 10 is a transaction diagram illustrating process flow 1000 for performing X2 topology discovery according to one embodiment. Process flow 1000 assumes an SCTP association has been previously established by RBSs 101-A and 101-B. Process flow 1000 will now be described with reference to previously discussed figures. At transaction 1005, network device 102-A is enabled to snoop X2-C packets for remote X2-U IP addresses.

At transaction 1010, RBS 101-A initiates a HANDOVER REQUEST packet destined for RBS 101-B by transmitting the packet to network device 102-A. A HANDOVER REQUEST is typically transmitted when a user equipment (UE) such as a mobile device that is attached/connected to a local RBS needs to attach/connect to another/remote RBS. At transactions 1011-1012, network devices 102-A and 102-B, respectively, forward the HANDOVER REQUEST packet to RBS 101-B, which receives the packet at transaction 1013. In one embodiment, network device 102-A and/or network device 102-B is configured to snoop X2-C packets to determine if a remote X2-U IP address can be discovered from the X2-C packet, e.g., by determining if the X2-C packet is an HANDOVER REQUEST ACK packet.

At transaction 1015, network device 102-A determines the X2-C packet is not a HANDOVER REQUEST ACK. Thus, network device 102-A does not discover any remote X2-U IP address from the HANDOVER REQUEST ACK packet. At transaction 1020, in response to receiving the HANDOVER REQUEST, RBS 101-B initiates a HANDOVER REQUEST ACK packet destined for RBS 101-A. At transactions 1021-1022, network device 102-B and network device 102-A, respectively, forward the HANDOVER REQUEST ACK packet to RBS 101-A, which receives the packet at transaction 1023.

At transaction 1025, network device 102-A determines the packet received at transaction 1022 is a HANDOVER REQUEST ACK received from remote RBS 101-B. At transaction 1030, in response to determining the received packet is a HANDOVER REQUEST ACK from a remote RBS, network device 102-A discovers a remote X2-U IP address based on information of the HANDOVER REQUEST ACK. At transaction 1035, network device 102-A uses the discovered IP address to create a network route (e.g., a VPN route) between RBS 101-A and RBS 101-B. In one embodiment, network device 102-A only creates the network route when one does not already exist in routing table 111-A. In one embodiment, when a network route is automatically created using the discovered IP address, network device 102-A stores the network route information in routing table 111-A to prevent redundant creation of network routes when an X2 IP address is discovered.

Figure 11:
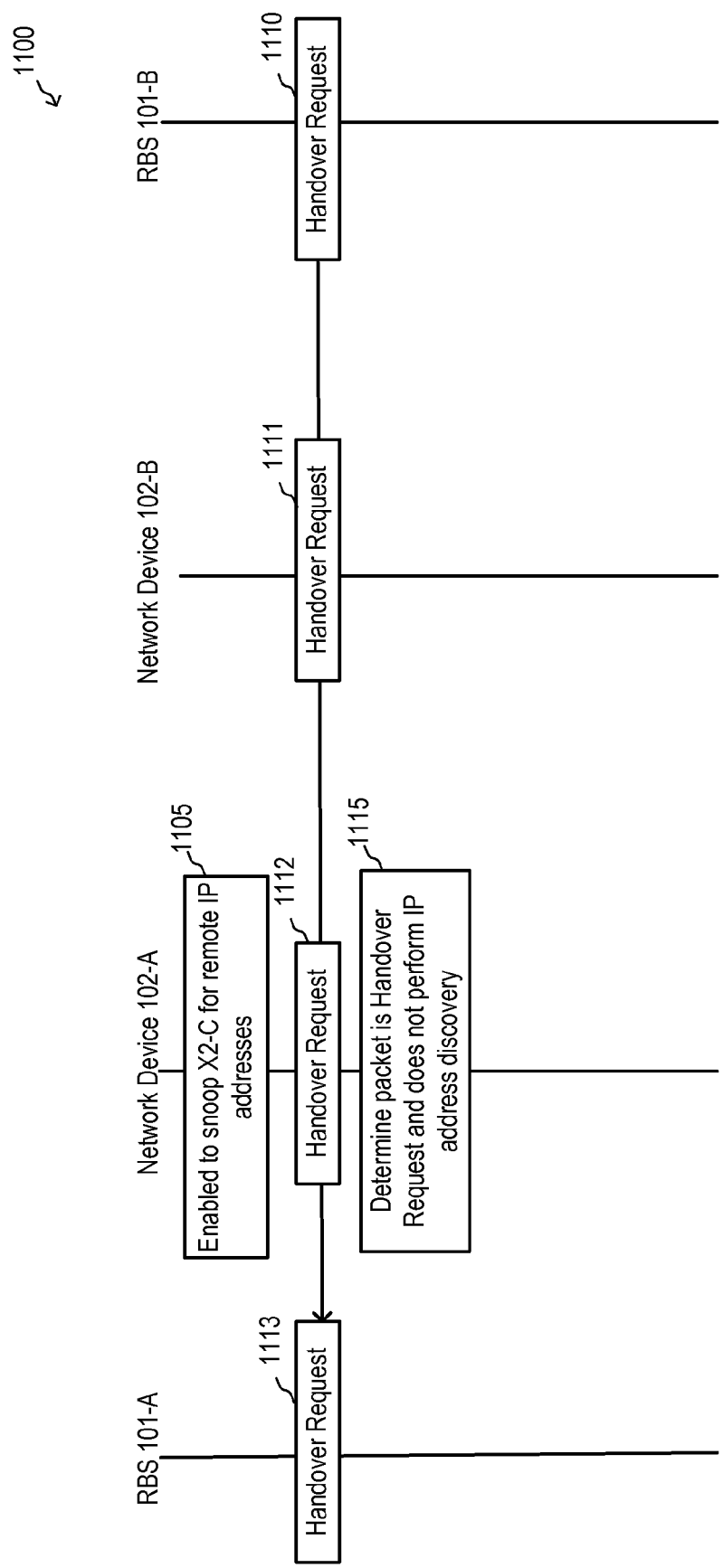
FIG. 11 is a transaction diagram illustrating a process flow for performing X2 topology discovery according to one embodiment.

FIG. 11 is a transaction diagram illustrating process flow 1100 for performing X2 topology discovery according to one embodiment. Process flow 1100 assumes an SCTP association has been previously established by RBSs 101-A and 101-B. Process flow 1100 will now be described with reference to previously discussed figures. At transaction 1105, network device 102-A is enabled to snoop X2-C packets for remote X2-U IP addresses.

At transaction 1110, RBS 101-B initiates a HANDOVER REQUEST packet destined for RBS 101-A by transmitting the packet to network device 102-B. A HANDOVER REQUEST is typically transmitted when a user equipment (UE) such as a mobile device that is attached/connected to a local RBS needs to attach/connect to another/remote eNB. At transactions 1111-1112, network devices 102-B and 102-A, respectively, forward the HANDOVER REQUEST packet to RBS 101-A, which receives the packet at transaction 1113. In one embodiment, network device 102-A and/or network device 102-B is configured to snoop X2-C packets to determine if a remote XU-C IP address can be discovered from the X2-C packet. In one embodiment, network device 102-A and/or network device 102-B is configured to discover remote X2-U IP addresses from HANDOVER REQUEST ACK packets originated from a remote RBS.

At transaction 1115, network device 102-A determines the packet received at transaction 1012 is a HANDOVER REQUEST received from remote RBS 101-B. In response to determining the received packet is not a HANDOVER REQUEST ACK from a remote RBS, network device 102-A does not perform any X2 IP address discovery.

Figure 12:
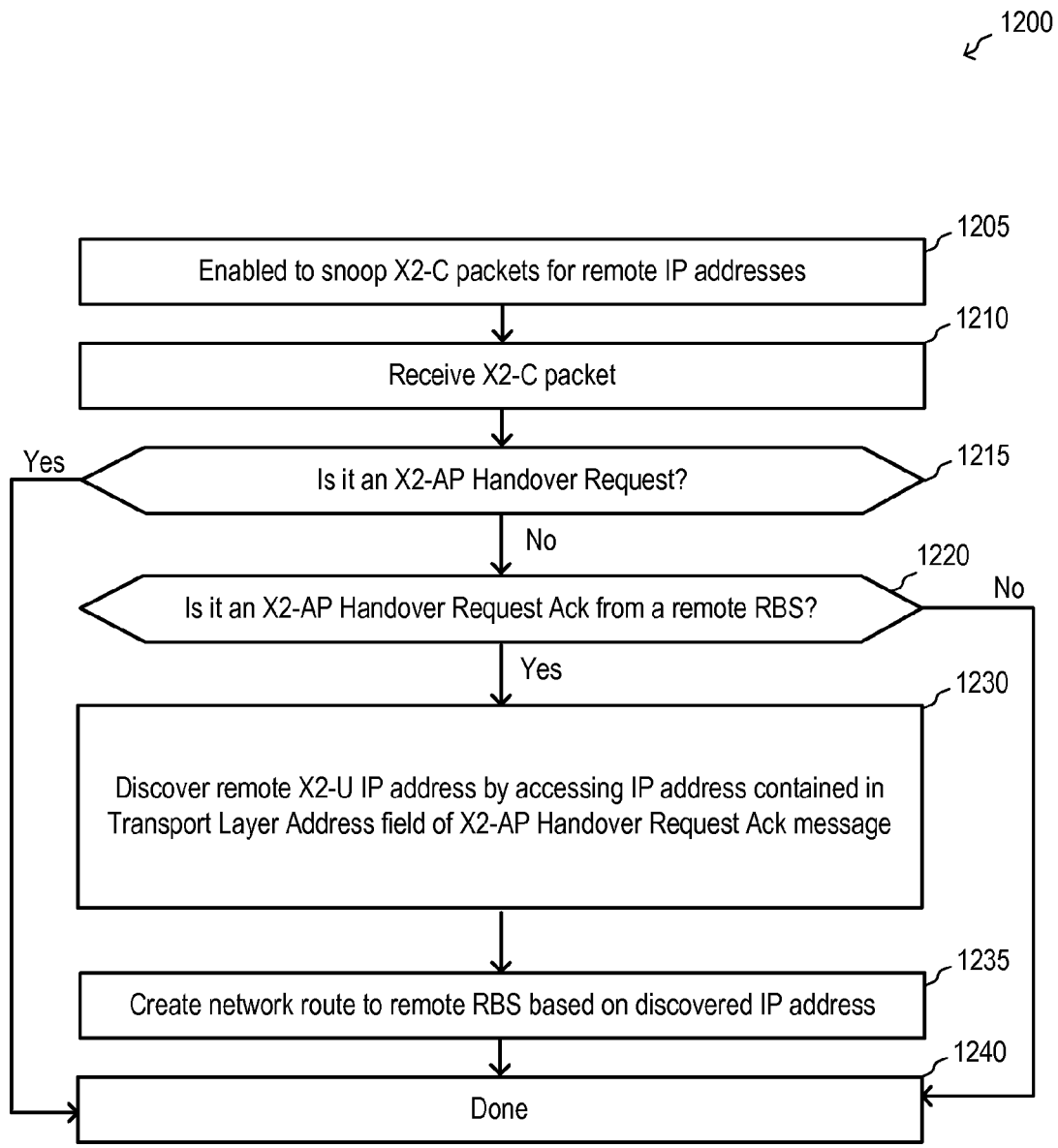
FIG. 12 is a flow diagram illustrating a method for performing X2 topology discovery according to one embodiment.

FIG. 12 is a flow diagram illustrating method 1200 for performing X2 topology discovery according to one embodiment. For example, method 1200 can be performed by network device 102-A (such as IP address discovery module 110-A of network device 102-A), or network device 102-B (such as IP address discovery module 110-B of network device 102-B), either of which can be implemented as software, firmware, hardware, or any combination thereof. Method 1200 will now be discussed with reference to previously discussed figures.

Figure 13:
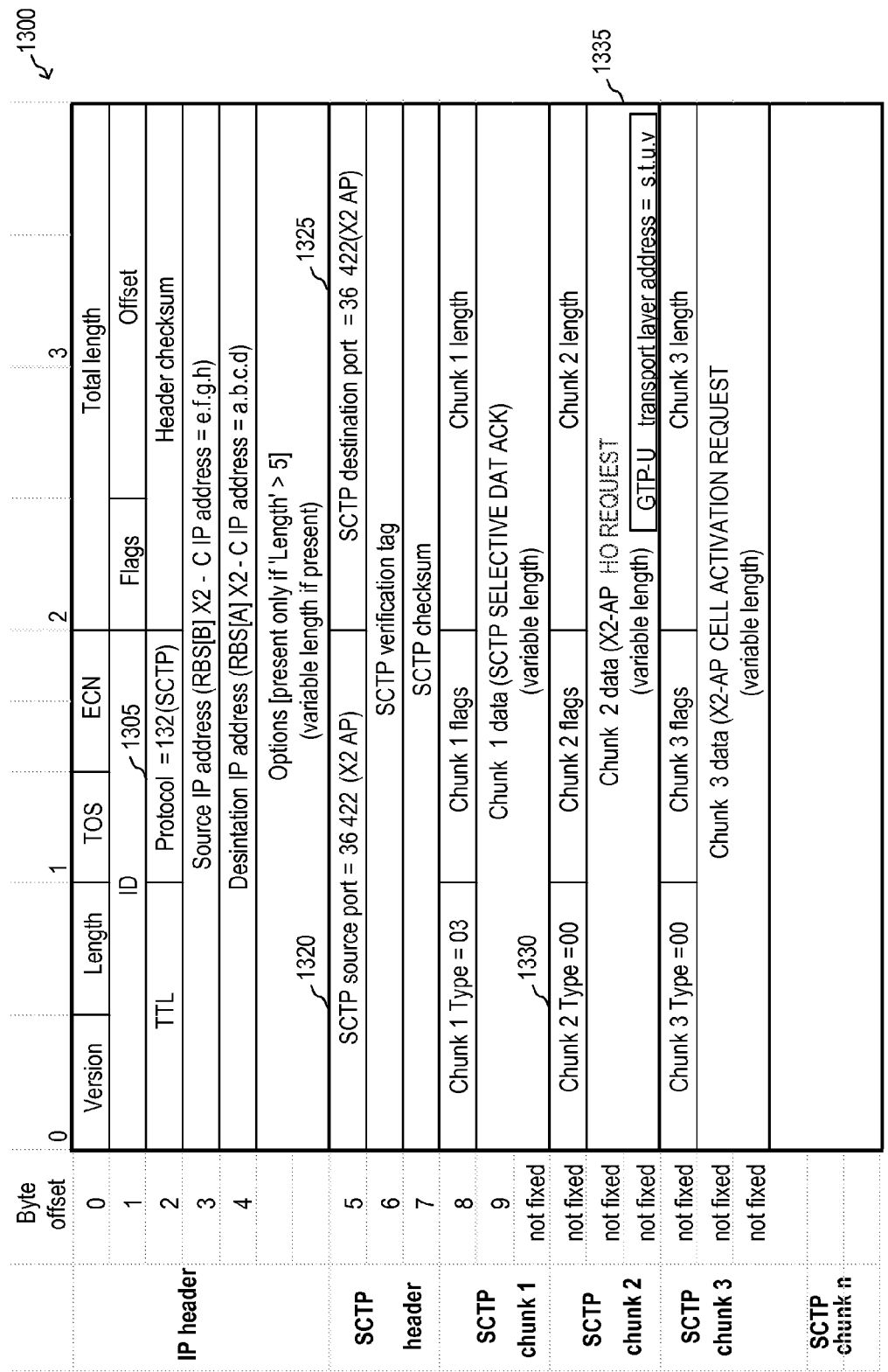
FIG. 13 is a block diagram illustrating a SCTP X2-AP HANDOVER REQUEST packet according to one embodiment.

At block 1205, a network device (e.g., network device 102-A) is enabled to snoop X2-C packets for remote X2-U IP addresses. At block 1210, the network device receives an X2-C packet. At block 1215, the network device determines whether the X2-C packet is a HANDOVER REQUEST. If so, method 1200 is completed at block 1240. FIG. 13 is a block diagram illustrating SCTP packet 1300 carrying an X2-AP packet in SCTP chunks 2-3. An X2-AP packet is defined by an SCTP packet with a protocol field (e.g., protocol field 1305) having the value 132, an SCTP source port field (such as SCTP source port field 1320) and a SCTP destination port field (such as SCTP destination port field 1325) both having the value 36,422, a chunk type/ID (such as chunk type 1330) having the value 0. Each X2-AP payload (such as X2-AP payload 1335) carries various types of packets/messages, including for example, HANDOVER REQUEST, HANDOVER REQUEST ACK, CELL ACTIVATION REQUEST, etc. As illustrated in FIG. 13, X2-AP payload 1335 carries a HANDOVER REQUEST packet. FIG. 13 illustrates by way of example, and not limitation, a format of an X2 AP packet. It will be appreciated that other X2 AP packet formats can be used without departing from the broader scope and spirit of the present invention.

FIG. 14 illustrates a pseudo code for X2-AP packet 1400 carrying a HANDOVER REQUEST packet according to one embodiment. A HANDOVER REQUEST packet is defined by an X2-AP packet with a procedure code field (such as procedure code field 1405) having the value 0, and a message value field (such as message value field 1415) having the value HandoverRequest.

Figure 15:
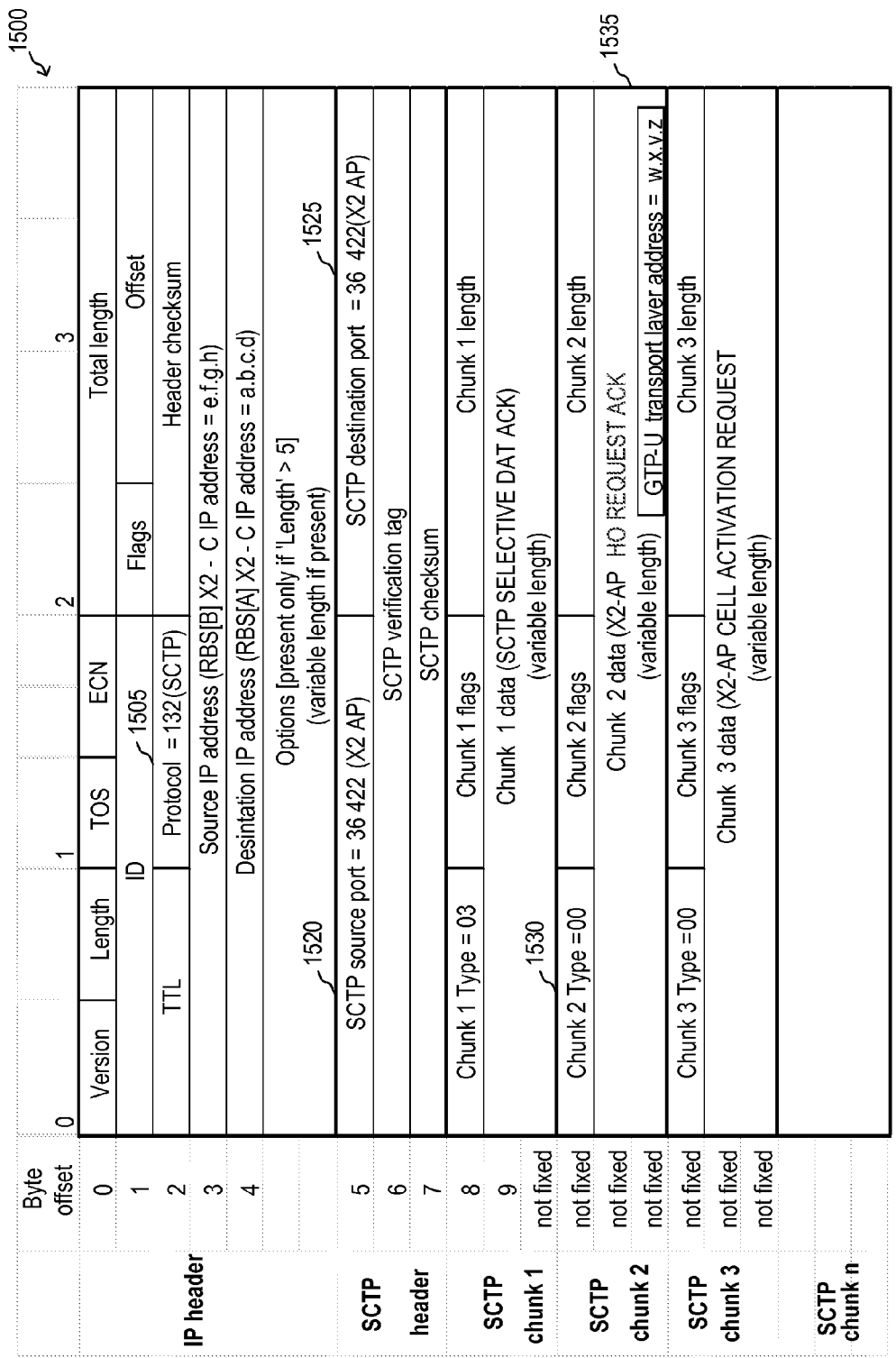
FIG. 15 is a block diagram illustrating a SCTP X2-AP HANDOVER REQUEST ACK packet according to one embodiment.

Referring now back to FIG. 12, at block 1220, in response to determining the X2-C packet is not a HANDOVER REQUEST, the network device determines whether the X2-C packet is a HANDOVER REQUEST ACK packet received from a remote RBS. FIG. 15 is a block diagram illustrating SCTP packet 1500 carrying an X2-AP packet in SCTP chunks 2-3 according to one embodiment. An X2-AP packet is defined by an SCTP packet with a protocol field (e.g., protocol field 1505) having the value 132, an SCTP source port field (such as SCTP source port field 1520) and a SCTP destination port field (such as SCTP destination port field 1525) both having the value 36,422, a chunk type/ID (such as chunk type field 1530) having the value 0. Each X2-AP payload (such as X2-AP payload 1535) carries various types of packets/messages, including for example, HANDOVER REQUEST, HANDOVER REQUEST ACK, CELL ACTIVATION REQUEST, etc. As illustrated in FIG. 15, X2-AP payload 1535 carries a HANDOVER REQUEST ACK packet. FIG. 15 illustrates by way of example, and not limitation, a format of an SCTP packet carrying an X2-AP packet. It will be appreciated that other formats can be used without departing from the broader scope and spirit of the present invention.

FIG. 16 illustrates a pseudo code for X2-AP packet 1600 carrying a HANDOVER REQUEST ACK packet according to one embodiment. A HANDOVER REQUEST ACK packet is defined by an X2-AP packet with a procedure code field (such as procedure code field 1605) having the value 0, and a message value field (such as message value field 1615) having the value HandoverRequestAcknowledge. Each HANDOVER REQUEST ACK message includes an information element (IE) that includes the Transport Network Layer (TNL) information for the target/remote RBS to use for a GPRS Tunneling Protocol—User Plane (GTP-U) tunnel when forwarding data to the local RBS which initiated the HANDOVER REQUEST ACK packet. The TNL information includes, for example, a transport layer address (such as transport layer address field 1610). In one embodiment, when a HANDOVER REQUEST ACK is received from a remote RBS, the receiving network device (e.g., network device 102-A or network device 102-B) discovers the X2-U IP address of the remote RBS by accessing the IP address contained in the transport layer address. FIG. 16 illustrates by way of example, and not limitation, a format of an X2-AP packet carrying a HANDOVER REQUEST ACK packet. It will be appreciated that other formats can be used without departing from the broader scope and spirit of the present invention.

Referring now back to FIG. 12, at block 1230, in response to determining the X2-C packet is a HANDOVER REQUEST ACK from a remote RBS, the network device discovers a remote X2-U IP address by accessing an IP address contained in the transport layer address field (e.g., transport layer address field 1610) of the received HANDOVER REQUEST ACK packet.

At block 1235, in response to discovering a remote X2-U IP address, the network device uses the discovered IP address to create a network route (e.g., a VPN route) between a local RBS (such as network device 102-A) and a remote RBS (such as RBS 101-B). In one embodiment, the network device only creates the network route if one does not already exist in a routing table (e.g., routing table 111-A). In one embodiment, in response to creating the network route, the network device stores the route information in the routing table in order to prevent redundant creation of routes for every discovered remote X2 IP address. At block 1240, if the received X2-C packet is not a HANDOVER REQUEST ACK received from a remote RBS, the network device completes the process without discovering any remote X2-U IP address. Method 1200 is illustrated as a sequence of operations. It will be appreciated that the order in which the operations are performed are illustrated only by way of example, and not limitation. The operations illustrated in FIG. 12 can be performed in other sequential order, or in parallel, without departing from the broader scope and spirit of the invention.

Figure 17:
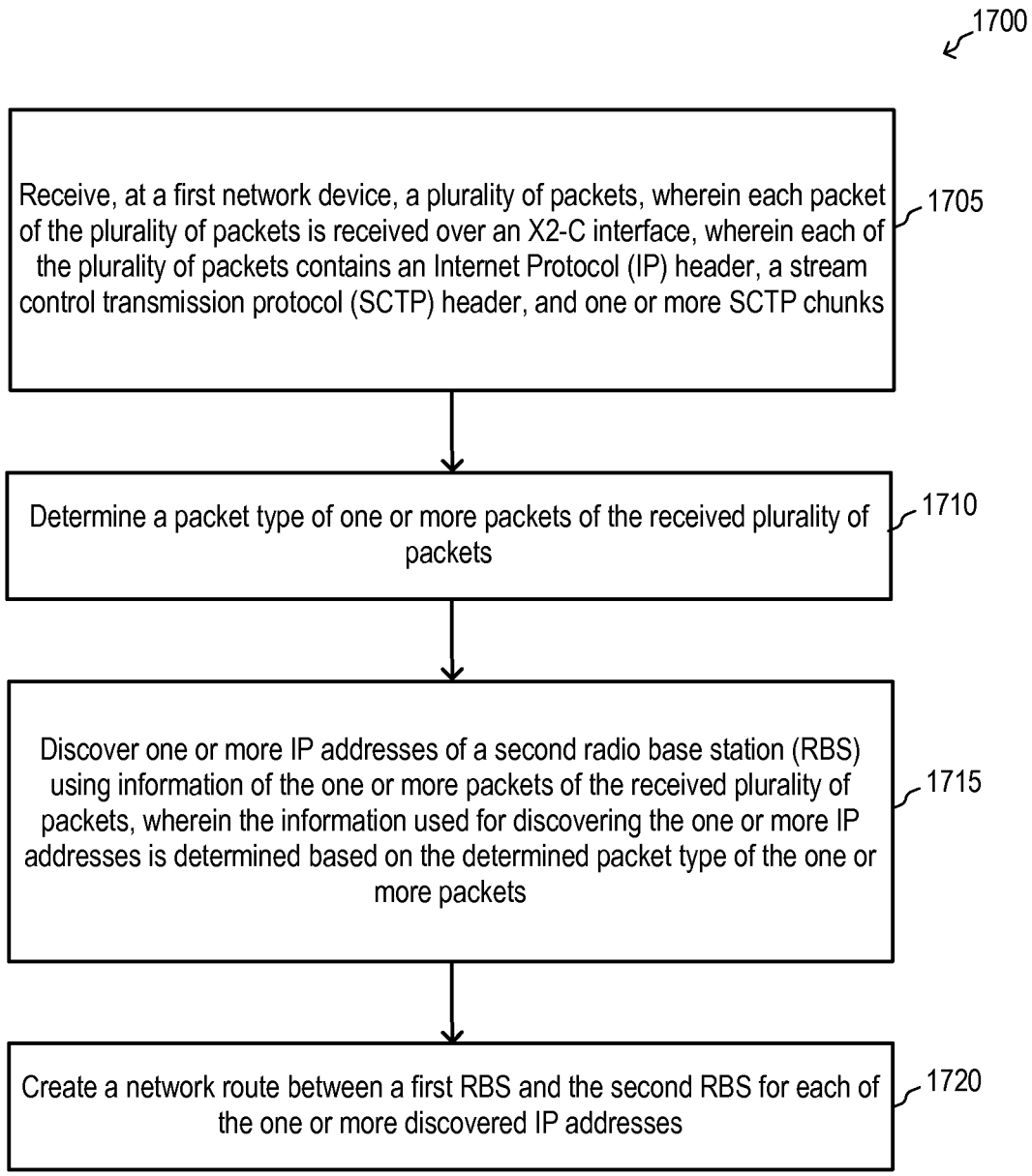
FIG. 17 is a flow diagram illustrating a method for performing X2 topology discovery according to one embodiment.

FIG. 17 is a flow diagram illustrating method 1700 ƒ for performing X2 topology discovery according to one embodiment. For example, method 1700 can be performed by network device 102-A or network device 102-B, either of which can be implemented in software, firmware, hardware, or any combination thereof. Method 1700 will now be described with reference to previously discussed figures.

Referring now to FIG. 17, at block 1705 a network device (e.g., network device 102-A) receives a plurality of packets, wherein each packet of the plurality of packets is received over an X2-C interface (e.g., X2-C interface 120), wherein each of the plurality of packets contains an Internet Protocol (IP) header, a stream control transmission protocol (SCTP) header, and one or more SCTP chunks.

At block 1710, the network device determines a packet type of one or more packets of the received plurality of packets. For example, the network device determines if the received packet is an SCTP INIT ACK packet, an X2-AP packet, a HANDOVER REQUEST packet, or a HANDOVER REQUEST ACK packet.

At block 1715, the network device discovers one or more IP addresses of a second RBS (e.g., remote RBS 101-B) using information of the one or more packets of the received plurality of packets, wherein the information used for discovering the one or more IP addresses is determined based on the determined packet type of the one or more packets. For example, in response to determining a received packet is an SCTP INIT ACK received from another network device (such as network device 102-B), i.e., the SCTP INIT ACK originated from a remote RBS (such as remote RBS 101-B), network device 102-A discovers an IP address of the second RBS by accessing an IP address contained in a source IP address field (such as source IP address field 510).

At block 1720, the network device creates a network route between a first RBS (e.g., local RBS 101-A) and the second RBS (e.g., remote RBS 101-B) for each of the one or more discovered IP addresses. In one embodiment, the network device only creates the network route if one does not already exist in a routing table (e.g., routing table 111-A). In one embodiment, in response to creating the network route, the network device stores the route information in the routing table in order to prevent redundant creation of routes for every discovered remote X2 IP address.

Figure 18:
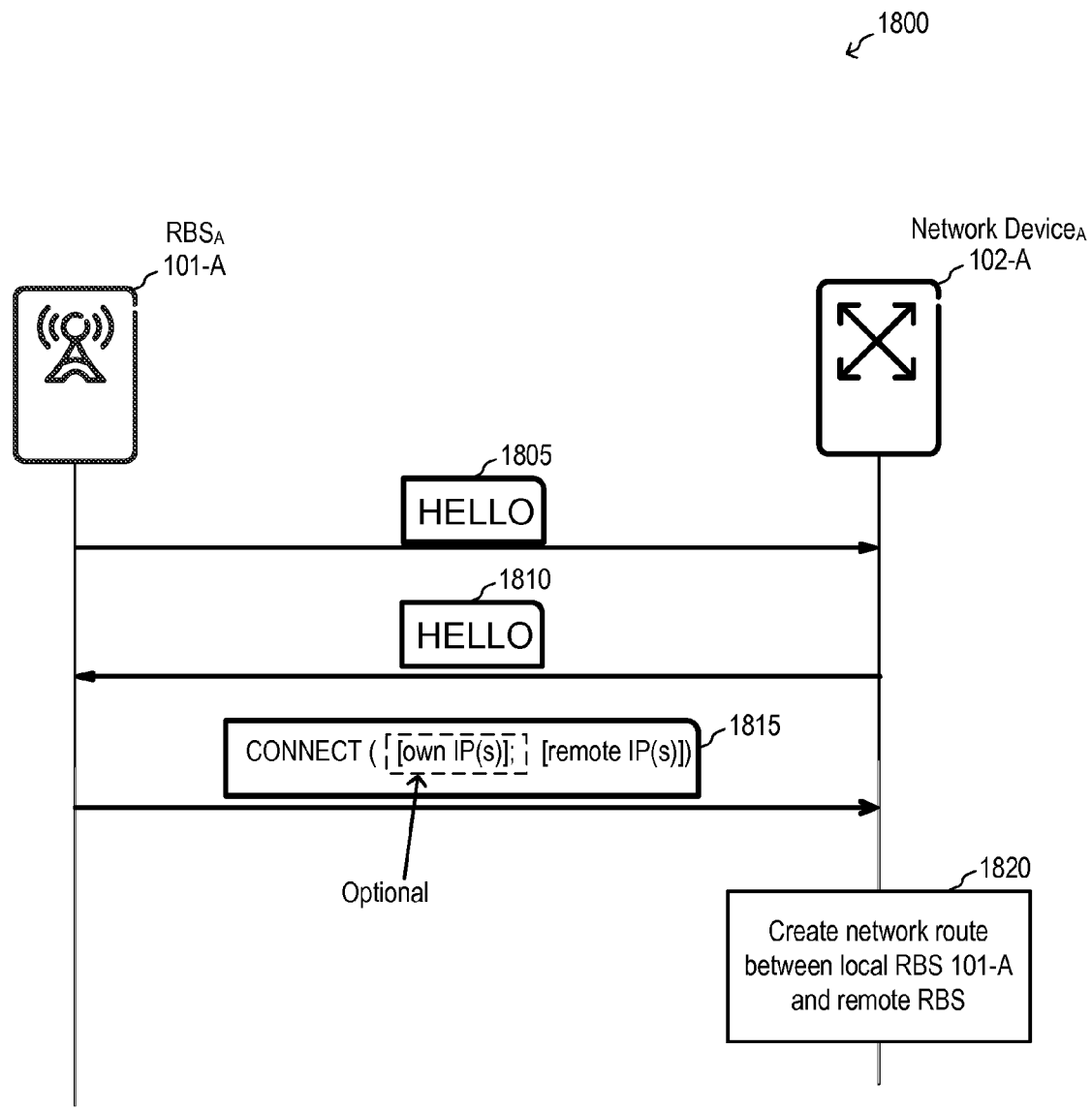
FIG. 18 is a transaction diagram illustrating a process flow for performing X2 topology discovery according to one embodiment.

X2 Topology Discovery Option 2: X2 IP Address Discovery Using Explicit Communication Between RBS and CSR FIG. 18 is a transaction diagram illustrating process flow 1800 for performing X2 topology discovery according to one embodiment. Process flow 1800 assumes that the IP address of network device 102-A has been configured on RBS 101-A. At transaction 1805, RBS 101-A decides to establish a connection-oriented interface with network device 102-A by transmitting a HELLO message to network device 102-A using the preconfigured IP address of network device 102-A. At transaction 1810, in response to receiving the HELLO message, network device 102-A transmits a HELLO message back to RBS 101-A. At this point, a connection-oriented interface (such as connection-oriented interface 140) is created, allowing RBS 101-A and network device 102-A to explicitly communicate with each other. Although transactions 1805 and 1810 illustrate that the connection-oriented interface is initiated by RBS 101-A, it will be appreciated that the connection-oriented interface can also be initiated by network device 102-A.

In one embodiment, RBS 101-A and network device 102-A are configured with a predetermined HELLO INTERVAL, such that RBS 101-A and network device 102-A are required to transmit a HELLO message to each other at least once during the HELLO INTERVAL. In one embodiment, RBS 101-A and network device 102-A are configured with a predetermined DEAD INTERVAL, such that if a HELLO message is not detected/received within the DEAD INTERVAL, the connection-oriented interface is declared down, and all previously acquired state information is cleared. In such an event, either RBS 101-A or network device 102-A must re-establish the connection-oriented interface if communication is still required.

At transaction 1815, in response to determining it requires connectivity to another IP subnet, RBS 101-A transmits a CONNECT message to network device 102-A. This typically occurs when an SCTP association is about to be established for an X2 interface or when a new user plane GTP-U IP address has been signaled by a remote RBS to a local RBS. In one embodiment, a CONNECT message includes a list of "remote IP addresses". The list of "remote IP addresses" includes one or more remote X2 IP addresses to which RBS 101-A requires X2 connectivity. If IPsec tunnel mode is used and the IPsec tunnel is terminated at the RBS on both ends, then the CONNECT message must also include, as part of the list of "remote IP addresses", the remote tunnel end point address used for each X2 interface that RBS 101-A has a definition for.

In one embodiment, the CONNECT message also includes an optional list of "own IP addresses". The list of "own IP addresses" includes one or more IP addresses of RBS 101-A. In embodiment, the CONNECT message always includes a complete set/list of "own IP addresses" and "remote IP addresses". To communicate removal or change of own/remote IP addresses, RBS 101-A transmits a new CONNECT message with the new list of own/remote IP addresses. In such an embodiment, network device 102-A infers new and/or removed IP addresses by comparing the list of own/remote IP addresses contained in the latest CONNECT message against the list of own/remote IP addresses contained in a previously received CONNECT message.

In some instances, when the network device and/or RBS needs to be taken down (e.g., for maintenance or replacement), the connection-oriented interface will be interrupted. When the connection-oriented interface is re-established, the RBS re-transmits a CONNECT message, which is a duplicate of a previous CONNECT message (i.e., the CONNECT messages contain the exact same IP addresses). In one embodiment, the network device detects such a duplicate CONNECT message and ignores it.

At transaction 1820, network device 102-A creates a network route between local RBS 101-A and remote RBS(s) for each IP address included in the list of "remote IP addresses". In one embodiment, a network route is created only if one does not already exist between the local and remote RBS for the corresponding remote IP address.

Figure 19A:
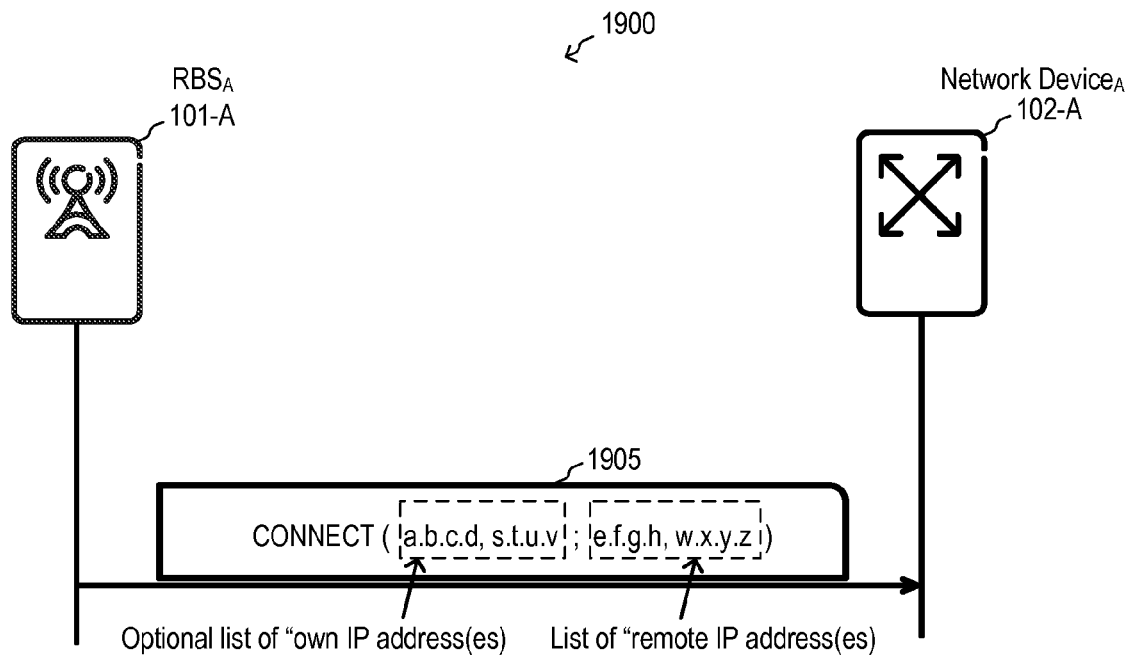
FIG. 19A is a transaction diagram illustrating a process flow for performing X2 topology discovery according to one embodiment.
Figure 19B:
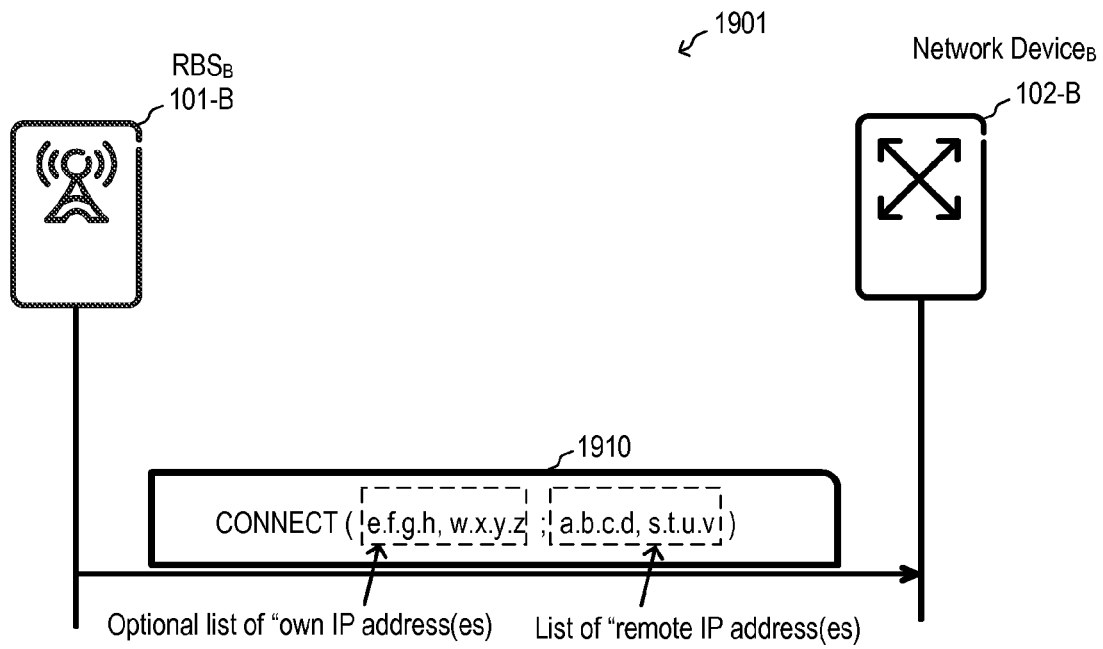
FIG. 19B is a transaction diagram illustrating a process flow for performing X2 topology discovery according to one embodiment.

FIGS. 19A-19B are transaction diagrams illustrating process flows 1900 and 1901, respectively, for performing X2 topology discovery according to one embodiment. Process flows 1900 and 1901 assume that RBSs 101-A and 101-B have been configured with X2-C IP addresses and X2-U IP addresses as illustrated in FIG. 1. For example, RBS 101-A has been configured with X2-C IP address "a.b.c.d" and X2-U IP address "s.t.u.v", and RBS 101-B has been configured with X2-C IP address "e.f.g.h" and X2-U IP address "w.x.y.z". Further, process flows 1900 and 1901 assume that a first connection-oriented interface has been established between RBS 101-A and network device 102-A (such as connection-oriented interface 140), and a second connection-oriented interface has been established between RBS 101-B and network device 102-B (such as connection-oriented interface 141).

Referring now to FIG. 19A, at transaction 1905, in response to determining that it requires connectivity to remote RBS 101-B, RBS 101-A transmits a CONNECT message to network device 102-A. The CONNECT message includes a list of "remote IP addresses" of "e.f.g.h" and w.x.y.z", which are the X2-C and X2-U IP addresses, respectively, of remote RBS 101-B. As illustrated, the CONNECT message also includes the optional list of "own IP addresses" of "a.b.c.d" and "s.t.u.v", which are the X2-C and X2-U IP addresses, respectively, of local RBS 101-A. In response to receiving the CONNECT message, network device 102-A creates a network route for each of the remote IP addresses, and stores the route information locally (e.g., as part of routing table 111-A).

Referring now to FIG. 19B, at transaction 1910, in response determining that it requires connectivity to remote RBS 101-A, RBS 101-B transmits a CONNECT message to network device 102-B. The CONNECT message includes a list of "remote IP addresses" of "a.b.c.d" and "s.t.u.v", which are the X2-C and X2-U IP addresses, respectively, of remote RBS 101-A. As illustrated, the CONNECT message also includes the optional list of "own IP addresses" of "e.f.g.h" and w.x.y.z", which are the X2-C and X2-U IP addresses, respectively, of local RBS 101-B. In response to receiving the CONNECT message, network device 102-B creates a network route for each of the remote IP addresses, and stores the route information locally (e.g., as part of routing table 111-B). The IP addresses are illustrated in FIGS. 19A-19B by way of example, and not limitation. It will be appreciated that more or less IP addresses can be included as part of the CONNECT messages.

Figure 20A:
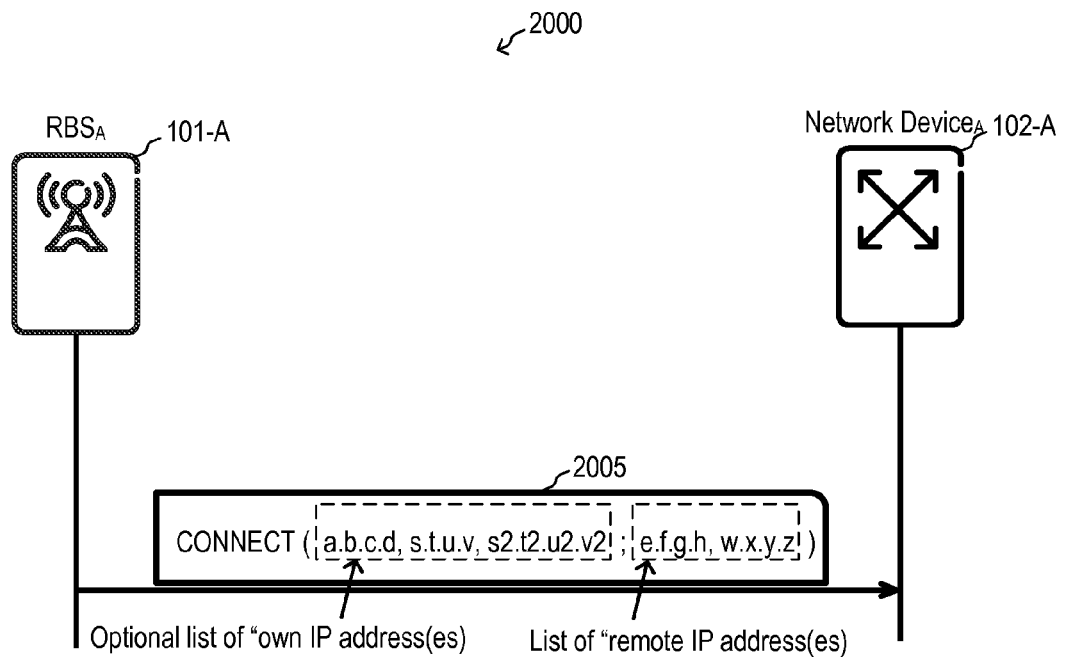
FIG. 20A is a transaction diagram illustrating a process flow for performing X2 topology discovery according to one embodiment.
Figure 20B:
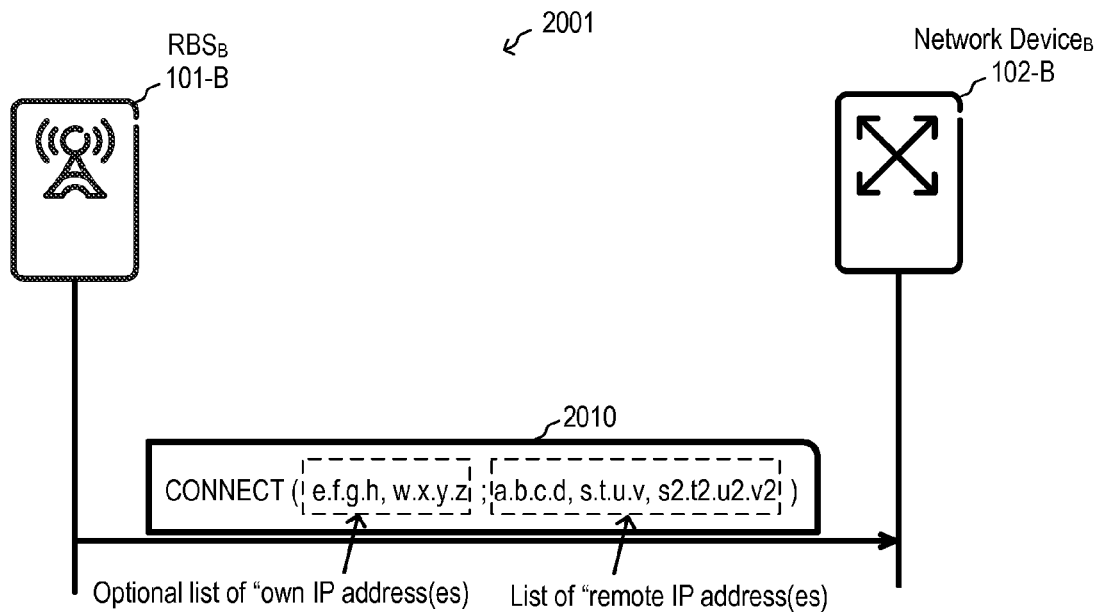
FIG. 20B is a transaction diagram illustrating a process flow for performing X2 topology discovery according to one embodiment.

FIGS. 20A-20B are transaction diagrams illustrating process flows 2000 and 2001, respectively, for performing X2 topology discovery according to one embodiment. Process flows 2000 and 2001 assume that some or all transactions of process flows 1900 and 1901 have been performed. Referring now to FIG. 20A, at transaction 2005, in response to determining that a new remote X2 IP address (e.g., IP address "s2.t2.u2.v2") has been added locally, RBS 101-A transmits a CONNECT message to network device 102-A. The new X2 IP address may be a new CoMP user plane IP address added by an OAM operation. The CONNECT message includes a list of "remote IP addresses" of "e.f.g.h" and w.x.y.z", which are the X2-C and X2-U IP addresses, respectively, of remote RBS 101-B. As illustrated, the CONNECT message also includes the optional list of "own IP addresses" of "a.b.c.d", "s.t.u.v", and "s2.t2.u2.v2", which are the X2-C, X2-U, and X2-U IP addresses, respectively, of local RBS 101-A. Note that although only IP address "s2.t2.u2.v2" is new, all own/remote IP addresses have been included in the CONNECT message.

Referring now to FIG. 20B, at transaction 2010, in response to determining that it requires a new route to a new remote X2 IP address (e.g., IP address "s2.t2.u2.v2"), RBS 101-B transmits a CONNECT message to network device 102-B. In one embodiment, RBS 101-B learns of the new remote X2 IP address through X2 signaling with RBS 101-A. Alternatively, RBS 101-B learns of the new remote X2 IP address through an OAM operation. The CONNECT message includes a list of "remote IP addresses" of "a.b.c.d", "s.t.u.v", and "s2.t2.u2.v2", which are the X2-C, X2-U, X2-U IP addresses, respectively, of remote RBS 101-A. As illustrated, the CONNECT message also includes the optional list of "own IP addresses" of "e.f.g.h" and w.x.y.z", which are the X2-C and X2-U IP addresses, respectively, of local RBS 101-B. Note that although only IP address "s2.t2.u2.v2" is new, all own/remote IP addresses have been included in the CONNECT message. In response to receiving the CONNECT message, network device 102-B creates a network route for each of the remote IP addresses, and stores the route information locally, e.g., as part of routing table 111-B. In one embodiment, network device 102-B only creates a network route if an existing network route corresponding a remote IP address has not already been created (e.g., based on route information stored locally in routing table 111-B). For example, in this illustration network device 102-B determines that network routes for remote X2 IP addresses "a.b.c.d" and "s.t.u.v" have been previously created. Thus, CSR 102-B only creates a new network route for remote X2 IP address "s2.t2.u2.v2". The IP addresses are illustrated in FIGS. 20A-20B by way of example, and not limitation. It will be appreciated that more or less IP addresses can be included as part of the CONNECT messages.

Figure 21A:
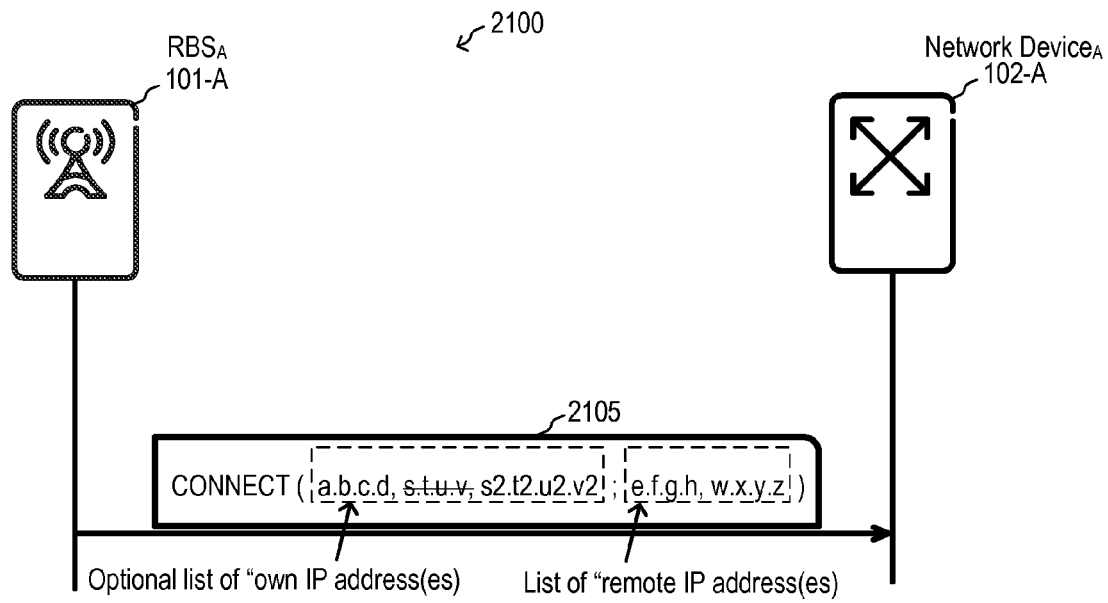
FIG. 21A is a transaction diagram illustrating a process flow for performing X2 topology discovery according to one embodiment.
Figure 21B:
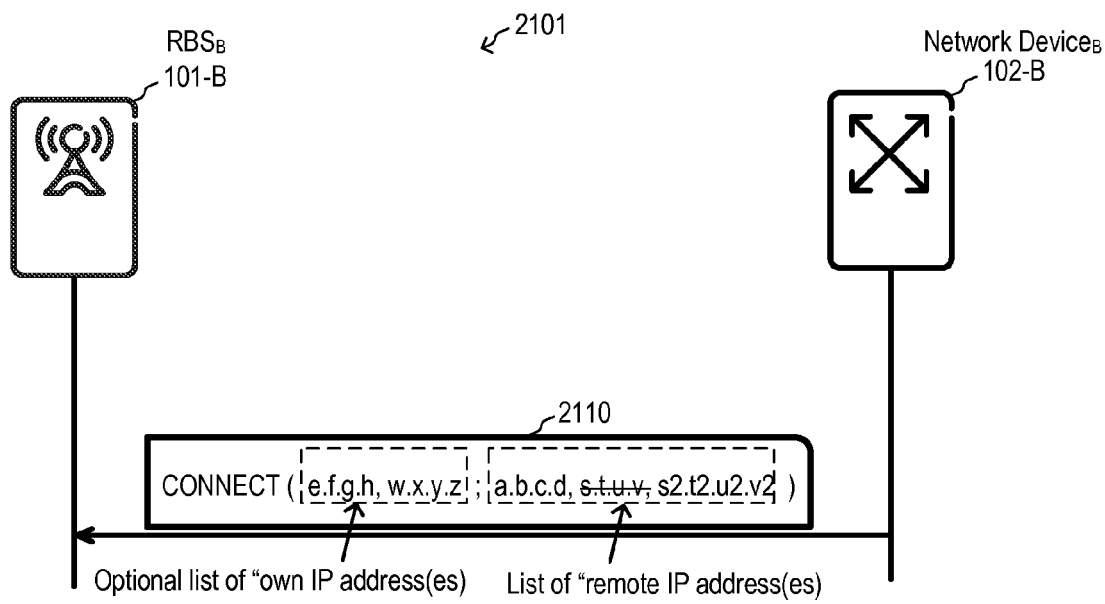
FIG. 21B is a transaction diagram illustrating a process flow for performing X2 topology discovery according to one embodiment.

FIGS. 21A-21B are transaction diagrams illustrating process flows 2100 and 2101, respectively, for performing X2 topology discovery according to one embodiment. Process flows 2100 and 2101 assume that some or all transactions of process flows 2000 and 2001 have been performed. Referring now to FIG. 21A, at transaction 2105, in response to determining that a local X2 IP address (e.g., IP address "s.t.u.v") has been deleted locally, RBS 101-A transmits a CONNECT message to network device 102-A. The local X2 IP address may be deleted, for example, by an OAM operation. The CONNECT message includes a list of "remote IP addresses" of "e.f.g.h" and w.x.y.z", which are the X2-C and X2-U IP addresses, respectively, of remote RBS 101-B. As illustrated, the CONNECT message also includes the optional list of "own IP addresses" of "a.b.c.d", and "s2.t2.u2.v2", which are the X2-C and X2-U IP addresses, respectively, of local RBS 101-A. Note that local X2 IP address "s.t.u.v" has been excluded from the list of "own IP addresses" in the CONNECT message (shown as "s.t.u.v"). By excluding the local IP address "s.t.u.v" from the list, RBS 101-A informs network device 102-A that the IP address has been deleted.

Referring now to FIG. 21B, at transaction 2110, in response to determining that connectivity to a remote X2 IP address (e.g., IP address "s.t.u.v") is no longer necessary, RBS 101-B transmits a CONNECT message to network device 102-B. In one embodiment, RBS 101-B learns that connectivity to the remote X2 IP address is no longer necessary through X2 signaling with RBS 101-A. Alternatively, RBS 101-B that connectivity to the remote X2 IP address is no longer necessary through an OAM operation. The CONNECT message includes a list of "remote IP addresses" of "a.b.c.d" and "s2.t2.u2.v2", which are the X2-C and X2-U IP addresses, respectively, of remote RBS 101-A. Note that remote X2 IP address "s.t.u.v" has been excluded from the list of "remote IP addresses" in the CONNECT message (shown as "s.t.u.v"). By excluding the remote X2 IP address, RBS 101-B explicitly communicates to network device 102-B that connectivity to the excluded X2 IP address is no longer necessary.

As illustrated, the CONNECT message also includes the optional list of "own IP addresses" of "e.f.g.h" and w.x.y.z", which are the X2-C and X2-U IP addresses, respectively, of local RBS 101-B. In response to receiving the CONNECT message, network device 102-B determines that the network route for remote IP address "s.t.u.v" is no longer needed. For example, network device 102-B compares the list of "remote IP addresses" in the latest CONNECT message received at transaction 2110 against the list of "remote IP addresses" in the CONNECT message previously received at transaction 2010, and determines that remote IP address "s.t.u.v" has been excluded. In response to determining the remote X2 IP address "s.t.u.v" has been excluded from the latest list of "remote IP addresses", network device 102-B removes the network route corresponding to the excluded remote IP address. The IP addresses are illustrated in FIGS. 21A-21B by way of example, and not limitation. It will be appreciated that more or less IP addresses can be included as part of the CONNECT messages.

Figure 22A:
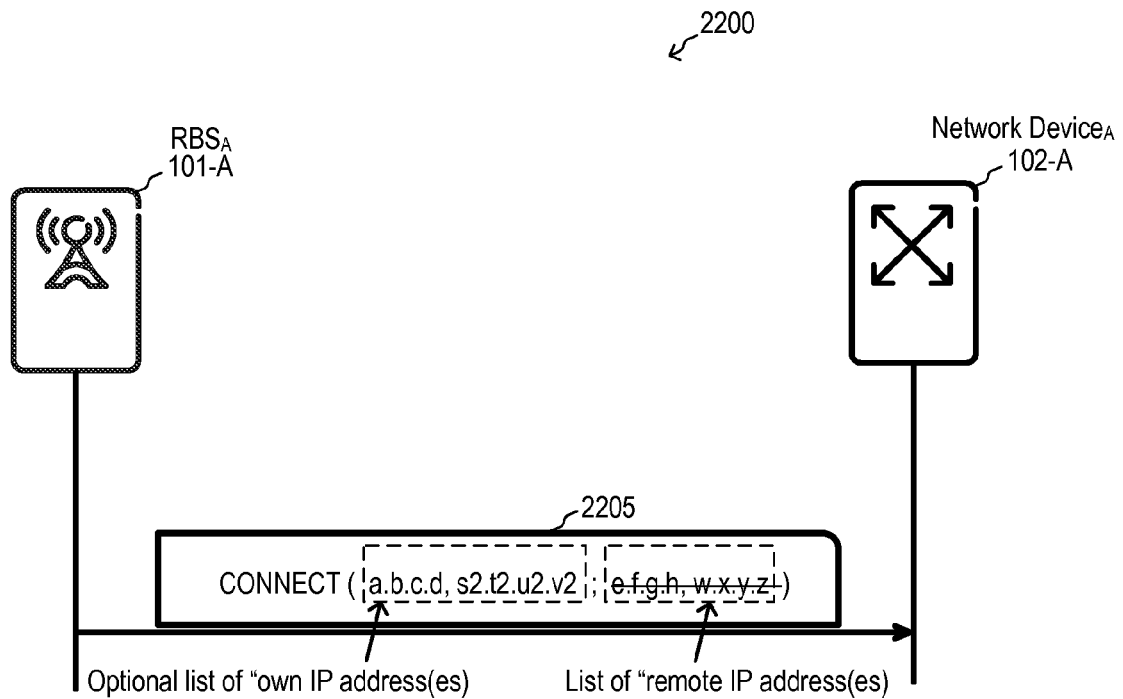
FIG. 22A is a transaction diagram illustrating a process flow for performing X2 topology discovery according to one embodiment.
Figure 22B:
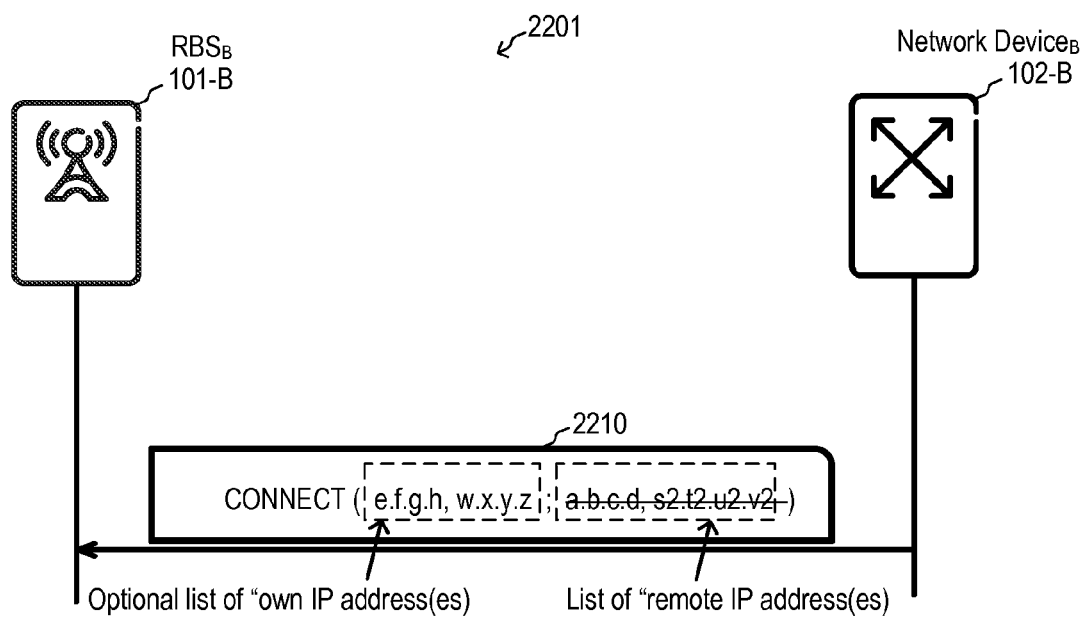
FIG. 22B is a transaction diagram illustrating a process flow for performing X2 topology discovery according to one embodiment.

FIGS. 22A-22B are transaction diagrams illustrating process flows 2200 and 2201, respectively, for performing X2 topology discovery according to one embodiment. Process flows 2200 and 2201 assume that some or all transactions of process flows 2100 and 2101 have been performed. Referring now to FIG. 22A, at transaction 2205, in response to determining that it needs to release a connection because it no longer requires connectivity with remote RBS 101-B, RBS 101-A transmits a CONNECT message to network device 102-A. The remote X2 IP address may be released, for example, by an OAM operation. To release all connections with a remote RBS, the local RBS would transmit a CONNECT message with an empty list of "remote IP addresses." For example, as illustrated, the CONNECT message includes an empty list of "remote IP addresses" because RBS 101-A has decided to release all connections associated with remote RBS 101-B. FIG. 22A further illustrates that the CONNECT message also includes the optional list of "own IP addresses" of "a.b.c.d", and "s2.t2.u2.v2", which are the X2-C and X2-U IP addresses, respectively, of local RBS 101-A.

In one embodiment, in response to receiving the CONNECT message with an empty list of "remote IP addresses", network device 102-A removes all network routes that were previously established between RBS 101-A and RBS 101-B. For example, network device 102-A removes network routes previously created for remote X2 IP addresses "e.f.g.h" and "w.x.y.z". In one embodiment, network device 102-A determines which network routes to remove by comparing the list of "remote IP addresses" in the latest CONNECT message received at transaction 2205 against the list of "remote IP addresses" in the CONNECT message previously received at transaction 2105, and determines that remote IP address "e.f.g.h" and "w.x.y.z" have been excluded. In response to determining the remote X2 IP address "e.f.g.h" and "w.x.y.z" have been excluded from the latest list of "remote IP addresses", network device 102-A removes the network routes corresponding to the excluded remote IP addresses.

Referring now to FIG. 22B, at transaction 2210, in response to determining that remote RBS 101-A has released all connections with RBS 101-B, RBS-B transmits a CONNECT message to network device 102-B to release all of its connections with RBS 101-A. In one embodiment, RBS 101-B learns that the connections have been released by RBS 101-A through X2 signaling with RBS 101-A. In an alternate embodiment, RBS 101-B learns that the connections have been released by RBS 101-A through an OAM operation. As illustrated, the CONNECT message includes empty a list of "remote IP addresses". By excluding all remote X2 IP address, RBS 101-B explicitly communicates to network device 102-B that connectivity to the excluded X2 IP address is no longer necessary. As illustrated, the CONNECT message also includes the optional list of "own IP addresses" of "e.f.g.h" and w.x.y.z", which are the X2-C and X2-U IP addresses, respectively, of local RBS 101-B. In response to receiving the CONNECT message with an empty list of "remote IP addresses", network device 102-B removes all network routes that were previously established between RBS 101-A and RBS 101-B. For example, network device 102-B removes network routes previously created for remote X2 IP addresses "a.b.c.d" and "s2.t2.u2.v2". In one embodiment, network device 102-B determines which network routes to remove by comparing the list of "remote IP addresses" in the latest CONNECT message received at transaction 2210 against the list of "remote IP addresses" in the CONNECT message previously received at transaction 2110, and determines that remote IP address "a.b.c.d" and "s2.t2.u2.v2" have been excluded. In response to determining the remote X2 IP address "a.b.c.d" and "s2.t2.u2.v2" have been excluded from the latest list of "remote IP addresses", network device 102-B removes the network routes corresponding to the excluded remote IP addresses. The IP addresses are illustrated in FIGS. 22A-22B by way of example, and not limitation. It will be appreciated that more or less IP addresses can be included as part of the CONNECT messages.

Process flows 1800-2201 have been described with respect to RBSs 101-A and 101-B, and network devices 102-A and 102-B. It will be appreciated, however, that the invention is not so limited. The mechanisms discussed herein for discovering X2 topology through explicit communication between an RBS and a network device equally applies to any RBS and network device in any network. Further, the mechanisms are not limited to two pairs of RBS/network device, but rather can be extended to any number of pairs of RBS/network device in any network.

As described above, in some instances, an RBS (e.g., RBS 101-A and/or 101-B) or network device (e.g., network device 102-A and/or 102-B) can fail to receive a HELLO packet within a DEAD INTERVAL. In such an event, the connection-oriented interface is declared down, and the connection-oriented interface must be re-established if communication is still required. In one embodiment, when the connection-oriented interface is declared down, all state information is cleared by network device, including, for example, removing all network routes created between the local RBS the remote RBS.

Figure 23:
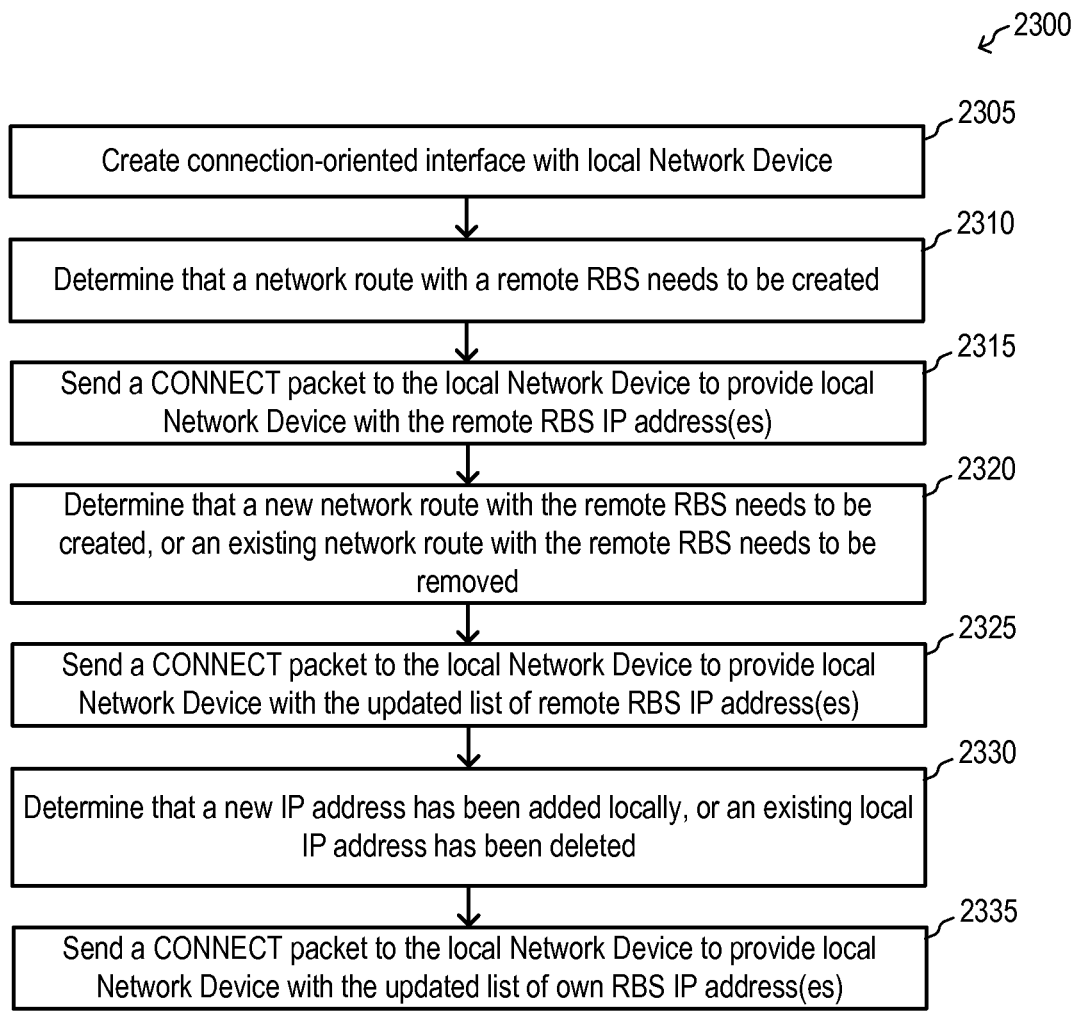
FIG. 23 is a flow diagram illustrating a method for performing X2 topology discovery according to one embodiment.

FIG. 23 is a flow diagram illustrating method 2300 for performing X2 topology discovery according to one embodiment. For example, method 2300 can be performed by RBS 101-A (such as IP address notifier 150-A of RBS 101-A), or RBS 101-B (such as IP address notifier 150-B of RBS 101-B), either of which can be implemented as software, firmware, hardware, or any combination thereof. Method 2300 will now be discussed with reference to previously discussed figures.

Referring now to FIG. 23, at block 2305, an RBS creates a connection-oriented interface with a local CSR. For example, RBS 101-A creates connection-oriented interface 140 with network device 102-A by sending a HELLO message (as part of transaction 1805) to network device 102-A.

At block 2310, the RBS determines that a network route/connection (e.g., a VPNv4 route) with a remote RBS needs to be created. For example, RBS 101-A determines that a network route with RBS 101-B needs to be created, or RBS 101-B determines that a network route with RBS 101-A needs to be created At block 2315, in response to determining that a network route with a remote RBS needs to be created, the RBS transmits a CONNECT packet/message to the local network device to provide the local network device with the remote RBS IP address. For example, at transaction 1905, in response to determining that a network route with remote RBS 101-B needs to be created, RBS 101-A transmits a CONNECT message wherein the list of "remote IP addresses" includes at least the IP address of remote RBS 101-B. Optionally, RBS 101-A may also include one or more of its own IP address as part of the list of "own IP addresses" in the CONNECT message.

At block 2320, the RBS determines that a new network route with a remote RBS needs to be created, or an existing network route with a remote RBS needs to be removed. At block 2325, in response to determining that a new network route needs to be created or an existing route needs to be removed, the RBS transmits a CONNECT message to the local network device to provide the local network device with the updated list of own/remote RBS IP addresses. For example, at transaction 2010, in response to determining a network route with remote RBS 101-A needs to be created for remote X2 IP address "s2.t2.u2.v2", RBS 101-B transmits a CONNECT message to network device 102-B, wherein the list of "remote IP addresses" includes the IP address "s2.t2.u2.v2". Also by way of example, at transaction 2110, in response to determining the existing network route with remote RBS 101-A for IP address "s.t.u.v" needs to be removed, RBS 101-B transmits a CONNECT message to network device 102-B, wherein the IP address "s.t.u.v" is excluded from the list of "remote IP addresses."

At block 2330, the RBS determines that a new IP address has been added locally, or an existing local IP address has been deleted. At block 2335, in response to determining that a new IP address has been added, or an existing IP address has been deleted, the RBS transmits a CONNECT message to the local network device to provide the local network device with the updated list of "own IP addresses". For example, at transaction 2005, in response to determining the IP address "s2.t2.u2.v2" has been added locally, RBS 101-A transmits a CONNECT message to network device 102-A, wherein the list of "own IP address" in the CONNECT message includes the new IP address "s2.t2.u2.v2". Also by way of example, at transaction 2105, in response to determining the existing local IP address "s.t.u.v" has been deleted locally, RBS 101-A transmits a CONNECT message wherein the deleted IP address "s.t.u.v" is excluded from the list of "own IP addresses". Method 2300 is illustrated as a sequence of operations. It will be appreciated that the order in which the operations are performed are illustrated only by way of example, and not limitation. The operations illustrated in FIG. 23 can be performed in other sequential orders, or in parallel, without departing from the broader scope and spirit of the invention.

Figure 24:
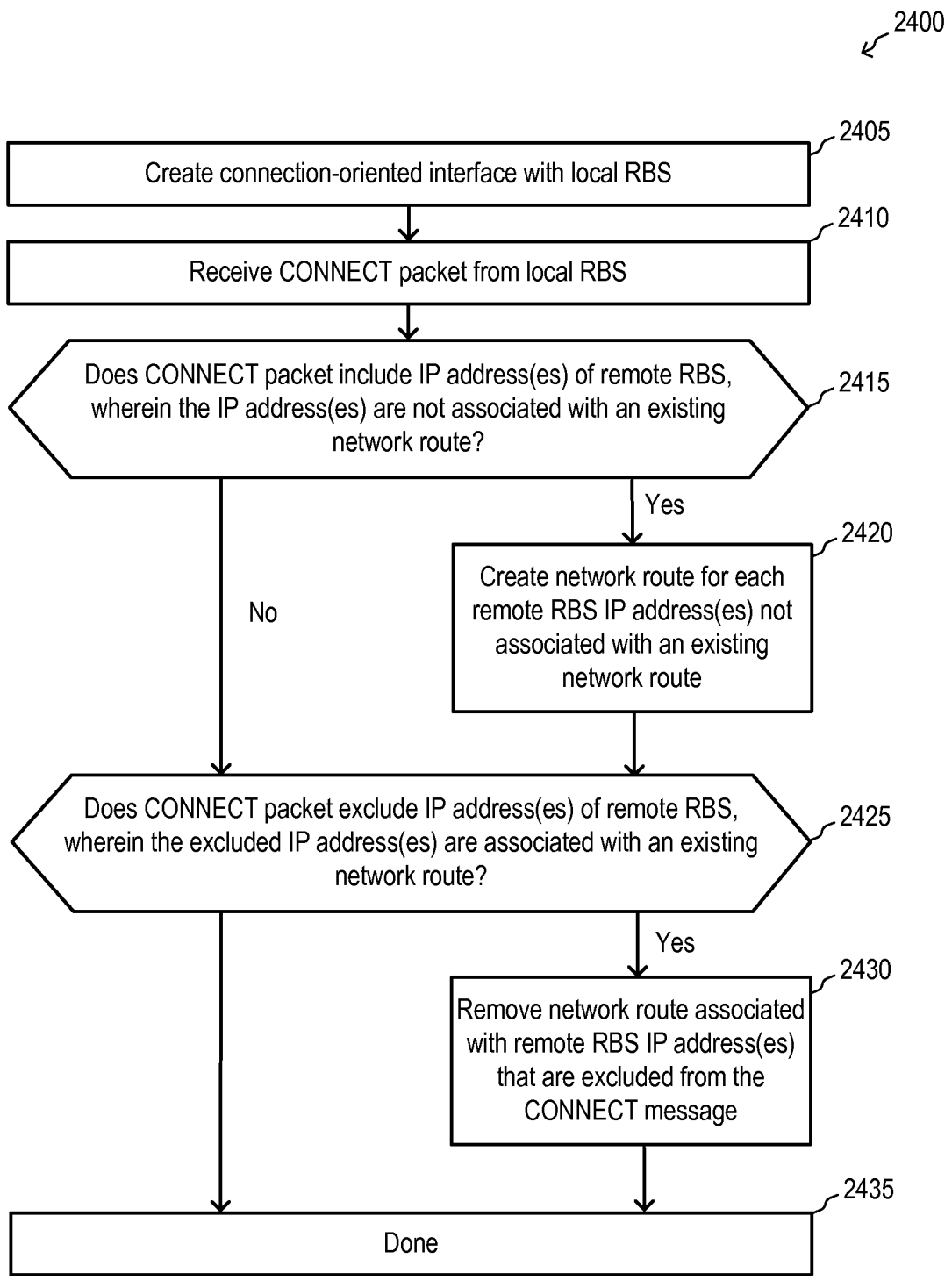
FIG. 24 is a flow diagram illustrating a method for performing X2 topology discovery according to one embodiment.

FIG. 24 is a flow diagram illustrating method 2400 for performing X2 topology discovery according to one embodiment. For example, method 2400 can be performed by network device 102-A (such as IP address discovery module 110-A of network device 102-A), or network device 102-B (such as IP address discovery module 110-B of network device 102-B), either of which can be implemented as software, firmware, hardware, or any combination thereof. Method 2400 will now be discussed with reference to previously discussed figures.

Referring now to FIG. 24, at block 2405, the network device creates a connection-oriented interface with a local RBS. For example, as part of transaction 1810, in response to receiving a HELLO message from local RBS 101-A, network device 102-A transmits a HELLO message to RBS 101-A. At block 2410, the network device receives a CONNECT message from the local RBS. For example, as part of transaction 2005, network device 102-A receives a CONNECT message from local RBS 101-A.

At block 2415, the network device determines if the received CONNECT message includes IP address(es) of a remote RBS, wherein the IP address(es) are not associated with an existing network route. For example, for each remote IP address included in the CONNECT message, the network device looks up a local routing table (such as routing tables 111-A) to determine if a network route exists.

At block 2420, in response to determining that the CONNECT message includes one or more remote IP addresses that are not associated with an existing network route, the network device creates a network route for each of the remote IP addresses not associated with an existing network route.

At block 2425, the network device determines if the CONNECT message excludes IP address(es) of the remote RBS, wherein the excluded IP address(es) are associated with an existing network route. For example, network device 102-A determines if an IP address of remote RBS 101-B has been excluded in the CONNECT message received as part of transaction 2105 by comparing the list of "remote IP addresses" against the list of "remote IP addresses" in the CONNECT message received as part of transaction 2005. Based on the comparison, network device 102-A determines that remote IP address "s.t.u.v" has been excluded from the CONNECT message of transaction 2105. In one embodiment, the network device determines if a network route exists for the excluded IP address by looking up a local routing table, such as routing tables 111-A.

At block 2430, in response to determining a network route currently exists for an excluded IP address, the network device removes the network route associated with the excluded remote IP address. In one embodiment, this also includes removing the associated network route information from the local routing table. At block 2435, the process is completed.

Figure 25:
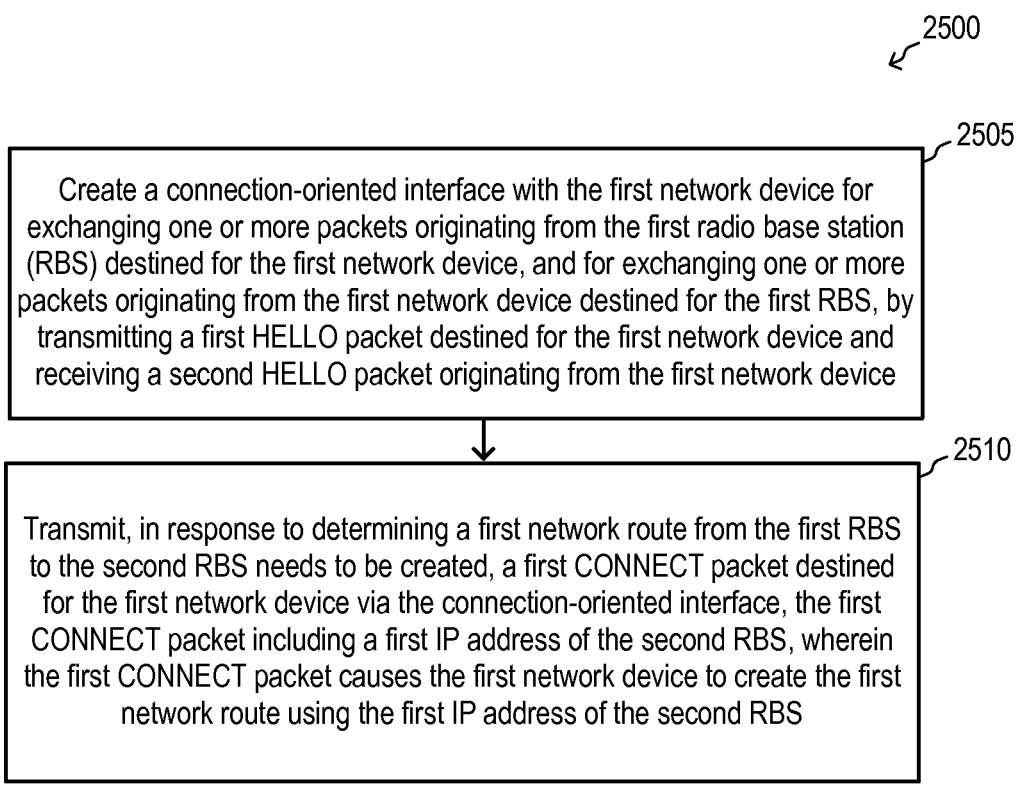
FIG. 25 is a flow diagram illustrating a method for performing X2 topology discovery according to one embodiment.

FIG. 25 is a flow diagram illustrating method 2500 for performing X2 topology discovery according to one embodiment. For example, method 2500 can be performed by RBS 101-A (such as IP address notifier 150-A of RBS 101-A), or RBS 101-B (such as IP address notifier 150-B of RBS 101-B), either of which can be implemented as software, firmware, hardware, or any combination thereof. Method 2500 will now be discussed with reference to previously discussed figures.

Referring now to FIG. 25, at block 2505 a first RBS (e.g., RBS 101-A) creates a connection-oriented interface (e.g., connection-oriented interface 140) with a first network device (e.g., network device 102-A) for exchanging one or more packets originating from the first RBS destined for the first network device (e.g., as part of transaction 1905), and for exchanging one or more packets originating from the first network device destined for the first RBS, by transmitting a first HELLO packet destined for the first network device (e.g., as part of transaction 1805), and receiving a second HELLO packet originating from the first network device (e.g., as part of transaction 1810).

At block 2510, the first RBS transmits, in response to determining a first network route from the first RBS to a second RBS (e.g., RBS 101-B) needs to be created, a first CONNECT packet destined for the first network device via the connection-oriented interface (e.g., as part of transaction 1905), the first CONNECT packet including a first IP address of the second RBS (e.g., as part of the list "remote IP addresses" of the first CONNECT packet), wherein the first CONNECT packet causes the first network device to create the first network route using the first IP address of the second RBS (e.g., as part of block 2420).

Figure 26:
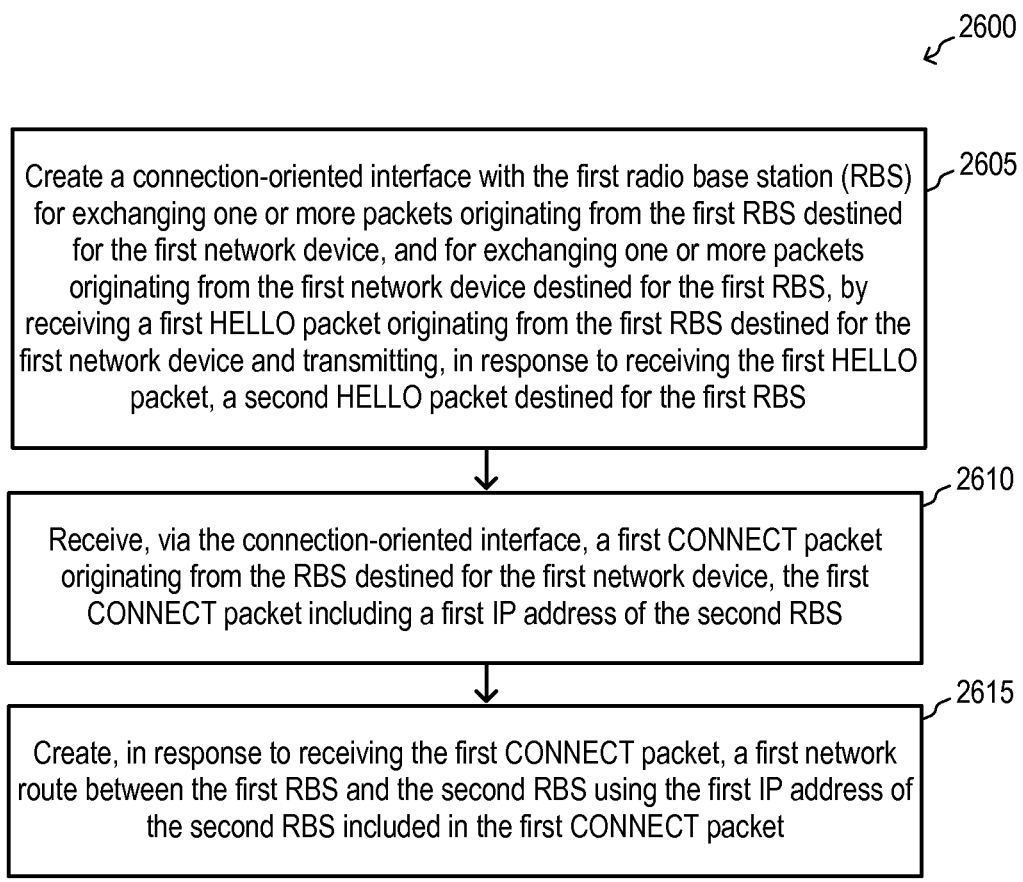
FIG. 26 is a flow diagram illustrating a method for performing X2 topology discovery according to one embodiment.

FIG. 26 is a flow diagram illustrating method 2600 for performing X2 topology discovery according to one embodiment. For example, method 2600 can be performed by network device 102-A (such as IP address discovery module 110-A of network device 102-A), or network device 102-B (such as IP address discovery module 110-B of network device 102-B), either of which can be implemented as software, firmware, hardware, or any combination thereof. Method 2600 will now be discussed with reference to previously discussed figures.

Referring now to FIG. 26, at block 2605, a first network device (e.g., network device 102-A) creates a connection-oriented interface (e.g., connection-oriented interface 140) with a first RBS (e.g., RBS 101-A) for exchanging one or more packets originating from the first RBS destined for the first network device, and for exchanging one or more packets originating from the first network device destined for the first RBS, by receiving a first HELLO packet originating from the first RBS (e.g., as part of transaction 1805) destined for the first network device, and transmitting, in response to receiving the first HELLO packet, a second HELLO packet destined for the first RBS (e.g., as part of transaction 1810).

At block 2610, the first network device receives, via the connection-oriented interface, a first CONNECT packet originating from the first RBS destined for the first network device (e.g., as part of transaction 1905), the first CONNECT packet including a first IP address of a second RBS (e.g., as part of the list of "remote IP addresses" in the CONNECT packet).

At block 2615, the first network device creates, in response to receiving the first CONNECT packet, a first network route between the first RBS and the second RBS (e.g., RBS 101-B) using the first IP address of the second RBS included in the first CONNECT packet (e.g., as part of transaction 2420).

Automatic VRF Configurations

In one embodiment, in response to discovering a remote X2 IP address, a CSR (which can be implemented as part of network device 102-A and/or 102-B) is configured to automatically add a new short network route (e.g., a VPN route) to its local Virtual Routing Function (VRF), if one does not already exist in the VRF. In one embodiment, the VRF is implemented as part of a routing table, such as routing tables 111-A and/or 111-B. In one embodiment, the installation of a short path to remote X2 IP addresses is limited only to those that have X2 interfaces defined with the CSR's local RBSs. Various embodiments of the present invention provide mechanisms that allow a CSR to restrict such installation either through restricted propagation through BGP or restricted installation at the local CSR.

VRF Configuration Option 1: Short Route Installation Using Import Route Maps

In one embodiment, a CSR installs a short path using import route maps that are included as part of the CSR's VRF. In this embodiment, the CSR is configured to issue a BGP ROUTE-REFRESH message to a route reflector (e.g., route reflector 160) to request routing updates from its Multiprotocol Internal Border Gateway Protocol (MP-IBGP) peers after undergoing a configuration change. In the event of an addition, deletion, or modification of VRFs or their associated configurations, the route-refresh capability enables the CSRs to update their routing tables. In response to receiving a BGP ROUTE-REFRESH message, the route reflector responds by transmitting a BGP UPDATE message to the CSR.

In this embodiment, within a given geographic area "X2_Area", the CSRs will export their local subnets with the same Route Target (RT) "X2_Area" into the MP-BGP. The CSRs will not export more specific routes for X2 when locally learned. In one embodiment, "X2_Area" is a special RT value defined by the operator when automatic VRF configuration is enabled at the CSR. In one embodiment, the CSR also applies an additional X2-driven selective import route map to the routes received in BGP UPDATE messages that are tagged with this special RT value.

In one embodiment, the BGP UPDATE messages received by a given CSR include all subnets advertised by all the CSRs exporting their locally reachable subnets with the area wide RT "X2_Area". Although the BGP UPDATE message includes all the CSRs' locally reachable subnets, only routes that are also in the local CSR's import route map are actually installed in its VRF.

In one embodiment, the local import route maps are automatically created by the local CSR based on information learned through the X2 topology discovery mechanisms discussed above. When a local CSR discovers a new remote X2 address, an additional entry is added to its local import route map. Routes can also be deleted from the VRF and import map as described above. Thus, in this embodiment, the operations of this VRF option can be summarized as follows:

1. The CSR installs the discovered remote IP address subnet as part of the route map within its VRF.
2. The CSR transmits a BGP ROUTE-REFRESH message to the route reflector to request for re-advertisement of the BGP routes.
3. In response to receiving the BGP ROUTE-REFRESH message, the route reflector transmits a BGP UPDATE message to the CSR which requested the ROUTE-REFRESH. The BGP UPDATE message includes all the cell site subnets.
4. The CSR will import the announced routes into the VRF only if the route(s) are associated with an RT value that matches the configured RT, and the route is included in the route import map.

VRF Configuration Option 2: Short Route Installation Using Outbound Route Filtering (ORF)

According to one embodiment, in response to discovering a remote X2 IP address, the CSR installs a short route from a local RBS to a remote RBS using an ORF. ORF enables a CSR to advertise to its peers, outbound route filters that peering CSRs or route reflectors can use while sending information to the CSR. In this embodiment, the ORF feature works in conjunction with the route-refresh BGP capability.

In this embodiment, within a given geographic area "X2_Area", CSRs will export their local subnets with the same RT "X2_Area" into the MP-BGP. The main difference between VRF configuration option 1 and VRF configuration option 2 is that with option 2, propagation of short routes from the route reflector to the CSRs is restricted through the use of ORFs in the route reflectors. Thus, the contents of the BGP UPDATE messages sent from the route reflector to the CSRs will be unique for each CSR and contain only X2 routes requested by a given CSR. When a local CSR learns about a new remote X2 address it updates its ORF at the route reflector to add this new address as a /32 subnet. Thus, VRF option 2 can be summarized as follows:

1. Each CSR in the network transmits an ORF request to the route reflector to add newly discovered remote X2 IP address as a /32 route to its ORF maintained at the route reflector.
2. Each CSR transmits a BGP ROUTE-REFRESH message to the route reflector to request for re-advertisement of the BGP routes.
3. In response to receiving the BGP ROUTE-REFRESH message, the route reflector transmits a BGP UPDATE message to each CSR that requested the ROUTE-REFRESH. The BGP UPDATE message includes the newly discovered X2 route. The BGP UPDATE message transmitted to each CSR will differ since each CSR requested different ORFs to be installed in the route reflector.
4. Assuming the X2 route is tagged with the RT "X2_Area", each CSR will import the newly announced X2 route.

VRF Configuration Option 3: Short Route Installation Using X2-Specific Individual RT Imports/Exports In this embodiment, when a CSR leans about a local RBS's X2 IP address, the CSR publishes it as a /32 route into the MP-BGP and tags it with a unique RT value. The unique RT value is generated automatically by applying a predetermined algorithm such as a hash or a cyclic redundancy check (CRC) on the learned local X2 IP address. Further, when a CSR discovers a new remote X2 IP address for which a new short path route is needed, the CSR generates an RT value by applying the same predetermined algorithm on the discovered remote RBS's X2 IP address. The CSR then includes the generated RT value as part of its local import statement. The RT value in the local import statement can then be used to identify which routes in the BGP ROUTE-REFRESH message needs to be imported into the VRF. Thus, VRF configuration option 3 can be summarized as follows by way of example. When a local CSR (e.g., network device 102-A) learns of a new X2 IP address of a local RBS (e.g., RBS 101-A):

1. Using a predefined algorithm, the local CSR generates a unique RT value from the local X2 IP address.
2. The local CSR updates its export rule to include the RT generated from the newly learned local X2 IP address.
3. The local CSR advertises the newly learned local X2 IP address as a /32 route into the MP-BGP and tags it with the generated RT value.

For example, assuming the configuration as illustrated in FIG. 1, after learning of the two local X2 IP addresses, network device 102-A will advertise the two new routes into the MP-BGP, one for the X2-C IP address "a.b.c.d/32" with a RT=F(x)[a.b.c.d] and a second for the X2-U IP address "s.t.u.v/32" with a RT=F(x)[s.t.u.v], where F(x) is a predetermined algorithm such as a hash or CRC. It will be appreciated that network device 102-B performs similar operations for local X2 IP addresses "e.f.g.h/32" and "w.x.y.z/32".

Further, when a remote CSR (e.g., network device 101-B) learns of a new remote X2 IP address of a remote RBS (e.g., RBS 101-A):

1. Using the same predefined algorithm that is used by the local CSR, the remote CSR generates an RT value from the newly discovered remote X2 IP address.
2. The remote CSR updates its import rule to include the RT value generated from the newly discovered remote X2 IP address.
3. The remote CSR transmits a BGP ROUTE-REFRESH message to a route reflector.
4. The route reflector, in response to receiving the BGP ROUTE-REFRESH message, transmits a BGP UPDATE message to the remote CSR. The BGP UPDATE message includes all the routes and any specific /32 routes advertised by other CSRs in the network.
5. The remote CSR processes the BGP UPDATE message using its own updated import statement. Assuming sufficient time has elapsed since the local CSR first advertised the specific /32 route, the BGP UPDATE message will include the new /32 route. If so, the remote CSR will install the new short path route because the new short route includes an RT value that is contained in the updated import rule.

Continuing on the above example, after learning of the two remote X2 IP addresses, network device 102-B will update its import statement with two new RTs, one for the X2-C IP address "a.b.c.d" with a RT=F(x)[a.b.c.d] and a second for X2-U IP address "s.t.u.v" with a RT=F(x)[s.t.u.v], where F(x) is the same predetermined algorithm used by network device 102-A. It will be appreciated that network device 102-A performs similar operations for remote X2 IP addresses "e.f.g.h" and "w.x.y.z".

In an embodiment where the BGP RT Constrained Route distribution feature is supported, a route reflector can perform selective distribution of routes based on RT-filtering. In such an embodiment, the CSRs that do not require a short path route for a given X2 session will be relieved from the burden of filtering the BGP UPDATE message based on their RT import list.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device that is communicatively coupled to a second network device in a network, the first network device communicatively coupled to a first radio base station (RBS), the second network device communicatively coupled to a second RBS, the method comprising:
   creating a connection-oriented interface with the first RBS for exchanging one or more packets originating from the first RBS destined for the first network device, and for exchanging one or more packets originating from the first network device destined for the first RBS, by:
      receiving a first HELLO packet originating from the first RBS destined for the first network device, and
      transmitting, in response to receiving the first HELLO packet, a first HELLO packet destined for the first RBS;
   receiving, via the connection-oriented interface, a first CONNECT packet originating from the first RBS destined for the first network device, the first CONNECT packet including a first IP address of the second RBS; and
   creating, in response to receiving the first CONNECT packet, a first network route between the first RBS and the second RBS using the first IP address of the second RBS included in the first CONNECT packet.

2. The method of claim 1, further comprising:
   receiving, via the connection-oriented interface, a second CONNECT packet originating from the first RBS destined for the first network device, the second CONNECT packet including the first IP address of the second RBS and a second IP address of the second RBS; and
   creating, in response to receiving the second CONNECT packet, a second network route between the first RBS and the second RBS using the second IP address of the second RBS included in the second CONNECT packet.

3. The method of claim 2, further comprising:
   receiving, via the connection-oriented interface, a third CONNECT packet originating from the first RBS destined for the first network device, the third CONNECT packet including the first IP address of the second RBS, the second IP address of the second RBS, a third IP address of the second RBS, and a first IP address of the first RBS; and
   creating, in response to receiving the third CONNECT packet, a third network route between the first RBS and the second RBS using the third IP address of the second RBS and the first IP address of the first RBS included in the third CONNECT packet.

4. The method of claim 3, further comprising:
   receiving, via the connection-oriented interface, a fourth CONNECT packet originating from the first RBS destined for the first network device, the fourth CONNECT packet including the second IP address of the second RBS, the third IP address of the second RBS, and the first IP address of the first RBS, wherein the first IP address of the second RBS is excluded from the fourth CONNECT packet; and
   removing, in response to receiving the fourth CONNECT packet and determining the first IP address of the second RBS is excluded from the fourth CONNECT packet, the first network route between the first RBS and the second RBS.

5. The method of claim 4, wherein the one or more packets originating from the first RBS destined for the first network device, and the one or more packets originating from the first network device destined for the first RBS are exchanged over the connection-oriented interface using an extensible messaging and presence protocol (XMPP).

6. The method of claim 5, wherein the one or more packets originating from the first RBS destined for the first network device, and the one or more packets originating from the first network device destined for the first RBS are exchanged over the connection-oriented interface using message authentication.

7. The method of claim 6, further comprising:
   receiving, via a first X2 interface, a first X2 packet from the first RBS;
   discovering a fourth IP address of the second RBS based on information of the first X2 packet; and
   creating, in response to discovering the fourth IP address of the second RBS, a fourth network route between the first RBS and the second RBS using the fourth IP address of the second RBS.

8. The method of claim 7, further comprising:
   receiving, via a second X2 interface a second X2 packet originating from the second RBS;
   discovering a fifth IP address of the second RBS based on information of the second X2 packet; and
   creating, in response to discovering the fifth IP address of the second RBS, a fifth network route between the first RBS and the second RBS using the fifth IP address of the second RBS.

9. The method of claim 8, further comprising:
   removing all network routes between the first RBS and the second RBS, in response to determining that a second HELLO packet originating from the first RBS has not been received by the first network device within a DEAD INTERVAL.

10. A first network device that is communicatively coupled to a second network device in a network, the first network device communicatively coupled to a first radio base station (RBS), the second network device communicatively coupled to a second RBS, the first network device comprising:
    an Internet Protocol (IP) address discovery module, configured to:
       create a connection-oriented interface with the first RBS for exchanging one or more packets originating from the first RBS destined for the first network device, and for exchanging one or more packets originating from the first network device destined for the first RBS, by:
          receiving a first HELLO packet originating from the first RBS destined for the first network device, and
          transmitting, in response to receiving the first HELLO packet, a first HELLO packet destined for the first RBS;
       receive, via the connection-oriented interface, a first CONNECT packet originating from the first RBS destined for the first network device, the first CONNECT packet including a first IP address of the second RBS; and
       create, in response to receiving the first CONNECT packet, a first network route between the first RBS and the second RBS using the first IP address of the second RBS included in the first CONNECT packet.

11. The first network device of claim 10, wherein the IP address discovery module is further configured to:
    receive, via the connection-oriented interface, a second CONNECT packet originating from the first RBS destined for the first network device, the second CONNECT packet including the first IP address of the second RBS and a second IP address of the second RBS; and create, in response to receiving the second CONNECT packet, a second network route between the first RBS and the second RBS using the second IP address of the second RBS included in the second CONNECT packet.

12. The first network device of claim 11, wherein the IP address discovery module is further configured to:
receive, via the connection-oriented interface, a third CONNECT packet originating from the first RBS destined for the first network device, the third CONNECT packet including the first IP address of the second RBS, the second IP address of the second RBS, a third IP address of the second RBS, and a first IP address of the first RBS; and
create, in response to receiving the third CONNECT packet, a third network route between the first RBS and the second RBS using the third IP address of the second RBS and the first IP address of the first RBS included in the third CONNECT packet.

13. The first network device of claim 12, wherein the IP address discovery module is further configured to:
receive, via the connection-oriented interface, a fourth CONNECT packet originating from the first RBS destined for the first network device, the fourth CONNECT packet including the second IP address of the second RBS, the third IP address of the second RBS, and the first IP address of the first RBS, wherein the first IP address of the second RBS is excluded from the fourth CONNECT packet; and
remove, in response to receiving the fourth CONNECT packet and determining the first IP address of the second RBS is excluded from the fourth CONNECT packet, the first network route between the first RBS and the second RBS.

14. The first network device of claim 13, wherein the one or more packets originating from the first RBS destined for the first network device, and the one or more packets originating from the first network device destined for the first RBS are exchanged over the connection-oriented interface using an extensible messaging and presence protocol (XMPP).

15. The first network device of claim 14, wherein the one or more packets originating from the first RBS destined for the first network device, and the one or more packets originating from the first network device destined for the first RBS are exchanged over the connection-oriented interface using message authentication.

16. The first network device of claim 15, wherein the IP address discovery module is further configured to:
receive, via a first X2 interface, a first X2 packet from the first RBS;
discover a fourth IP address of the second RBS based on information of the first X2 packet; and
create, in response to discovering the fourth IP address of the second RBS, a fourth network route between the first RBS and the second RBS using the fourth IP address of the second RBS.

17. The first network device of claim 16, wherein the IP address discovery module is further configured to:
receive, via a second X2 interface a second X2 packet originating from the second RBS;
discover a fifth IP address of the second RBS based on information of the second X2 packet; and
create, in response to discovering the fifth IP address of the second RBS, a fifth network route between the first RBS and the second RBS using the fifth IP address of the second RBS.

18. The first network device of claim 17, wherein the IP address discovery module is further configured to:
remove all network routes between the first RBS and the second RBS, in response to determining that a second HELLO packet originating from the first RBS has not been received by the first network device within a DEAD INTERVAL.

19. A method in a first radio base station that is communicatively coupled to a first network device in a network, the first network device communicatively coupled to a second network device that is communicatively coupled to a second RBS, the method comprising:
creating a connection-oriented interface with the first network device for exchanging one or more packets originating from the first RBS destined for the first network device, and for exchanging one or more packets originating from the first network device destined for the first RBS, by:
transmitting a first HELLO packet destined for the first network device, and receiving a first HELLO packet originating from the first network device; and
transmitting, in response to determining a first network route from the first RBS to the second RBS needs to be created, a first CONNECT packet destined for the first network device via the connection-oriented interface, the first CONNECT packet including a first IP address of the second RBS, wherein the first CONNECT packet causes the first network device to create the first network route using the first IP address of the second RBS.

20. The method of claim 19, further comprising:
transmitting, in response to determining a second network route from the first RBS to the second RBS needs to be created, a second CONNECT packet destined for the first network device via the connection-oriented interface, the second CONNECT packet including the first IP address of the second RBS and a second IP address of the second RBS, wherein the second CONNECT packet causes the first network device to create the second network route using the second IP address of the second RBS.

21. The method of claim 20, further comprising:
transmitting, in response to determining a third network route from the first RBS to the second RBS needs to be created, a third CONNECT packet destined for the first network device via the connection-oriented interface, the third CONNECT packet including the first IP address of the second RBS, the second IP address of the second RBS, a third IP address of the second RBS, and a first IP address of the first RBS, wherein the third CONNECT packet causes the first network device to create the third network route using the third IP address of the second RBS and the first IP address of the first RBS.

22. The method of claim 21, further comprising:
transmitting, in response to determining the first network route from the first RBS to the second RBS needs to be removed, a fourth CONNECT packet destined for the first network device via the connection-oriented interface, the fourth CONNECT packet including the second IP address of the second RBS, the third IP address of the second RBS, and the first IP address of the first RBS, wherein the fourth CONNECT packet excludes the first IP address of the second RBS, wherein by excluding the first IP address of the second RBS, the fourth CONNECT packet causes the first network device to remove the first network route.

23. The method of claim 22, wherein the one or more packets originating from the first RBS destined for the first network device, and the one or more packets originating from the first network device destined for the first RBS are exchanged over the connection-oriented interface using an extensible messaging and presence protocol (XMPP).

24. The method of claim 23, wherein the one or more packets originating from the first RBS destined for the first network device, and the one or more packets originating from the first network device destined for the first RBS are exchanged over the connection-oriented interface using message authentication.

25. A first radio base station (RBS) that is communicatively coupled to a first network device in a network, the first network device communicatively coupled to a second network device that is communicatively coupled to a second RBS, the first RBS comprising:
an Internet Protocol (IP) address notifier, configured to:
create a connection-oriented interface with the first network device for exchanging one or more packets originating from the first RBS destined for the first network device, and for exchanging one or more packets originating from the first network device destined for the first RBS, by:
transmitting a first HELLO packet destined for the first network device, and receiving a first HELLO packet originating from the first network device; and
transmit, in response to determining a first network route from the first RBS to the second RBS needs to be created, a first CONNECT packet destined for the first network device via the connection-oriented interface, the first CONNECT packet including a first IP address of the second RBS, wherein the first CONNECT packet causes the first network device to create the first network route using the first IP address of the second RBS.

26. The first RBS of claim 25, wherein the IP address notifier is further configured to:
transmit, in response to determining a second network route from the first RBS to the second RBS needs to be created, a second CONNECT packet destined for the first network device via the connection-oriented interface, the second CONNECT packet including the first IP address of the second RBS and a second IP address of the second RBS, wherein the second CONNECT packet causes the first network device to create the second network route using the second IP address of the second RBS.

27. The first RBS of claim 26, wherein the IP address notifier is further configured to:
transmit, in response to determining a third network route from the first RBS to the second RBS needs to be created, a third CONNECT packet destined for the first network device via the connection-oriented interface, the third CONNECT packet including the first IP address of the second RBS, the second IP address of the second RBS, a third IP address of the second RBS, and a first IP address of the first RBS, wherein the third CONNECT packet causes the first network device to create the third network route using the third IP address of the second RBS and the first IP address of the first RBS.

28. The first RBS of claim 27, wherein the IP address notifier is further configured to:
transmit, in response to determining the first network route from the first RBS to the second RBS needs to be removed, a fourth CONNECT packet destined for the first network device via the connection-oriented interface, the fourth CONNECT packet including the second IP address of the second RBS, the third IP address of the second RBS, and the first IP address of the first RBS, wherein the fourth CONNECT packet excludes the first IP address of the second RBS, wherein by excluding the first IP address of the second RBS, the fourth CONNECT packet causes the first network device to remove the first network route.

29. The first RBS of claim 28, wherein the one or more packets originating from the first RBS destined for the first network device, and the one or more packets originating from the first network device destined for the first RBS are exchanged over the connection-oriented interface using an extensible messaging and presence protocol (XMPP).

30. The first RBS of claim 29, wherein the one or more packets originating from the first RBS destined for the first network device, and the one or more packets originating from the first network device destined for the first RBS are exchanged over the connection-oriented interface using message authentication.

* * * * *

UNITED STATES PATENT AND TRADEMARK OFFICE
CERTIFICATE OF CORRECTION

Page 1 of 1

PATENT NO. : 9,294,986 B2
APPLICATION NO. : 14/056809
DATED : March 22, 2016
INVENTOR(S) : Wilkinson et al.

It is certified that error appears in the above-identified patent and that said Letters Patent is hereby corrected as shown below:

On the Title Page, in Item (74), under "Attorney, Agent or Firm", in Column 2, Line 1, delete "Vos;" and insert -- Vos --, therefor.

In the specification

In Column 9, Line 50, delete "CSR 101-A," and insert -- CSR 102-A, --, therefor.

In Column 13, Line 30, delete "ACK Similarly," and insert -- ACK. Similarly, --, therefor.

In Column 29, Line 38, delete "device 101-B)" and insert -- device 102-B) --, therefor.

Signed and Sealed this
Thirty-first Day of May, 2016

Michelle K. Lee
*Director of the United States Patent and Trademark Office*